(12) United States Patent
Motomiya et al.

(10) Patent No.: US 11,383,606 B2
(45) Date of Patent: Jul. 12, 2022

(54) PORT LOCKING ACTUATOR DEVICE FOR VEHICLE INLET

(71) Applicant: MURAKAMI CORPORATION, Shizuoka (JP)

(72) Inventors: Masahiro Motomiya, Fujieda (JP); Takayuki Miyazaki, Yaizu (JP); Kenji Ichikawa, Shizuoka (JP); Hiroki Takeuchi, Fujieda (JP)

(73) Assignee: MURAKAMI CORPORATION, Shizuoka (JP)

( * ) Notice: Subject to any disclaimer, the term of this patent is extended or adjusted under 35 U.S.C. 154(b) by 331 days.

(21) Appl. No.: 16/754,013

(22) PCT Filed: Oct. 2, 2018

(86) PCT No.: PCT/JP2018/036804
§ 371 (c)(1),
(2) Date: Apr. 6, 2020

(87) PCT Pub. No.: WO2019/073854
PCT Pub. Date: Apr. 18, 2019

(65) Prior Publication Data
US 2020/0398684 A1    Dec. 24, 2020

(30) Foreign Application Priority Data

Oct. 10, 2017    (JP) .............................. JP2017-197233

(51) Int. Cl.
*B60L 53/16*    (2019.01)
*H01R 13/24*    (2006.01)
(Continued)

(52) U.S. Cl.
CPC .......... *B60L 53/16* (2019.02); *H01R 13/2471* (2013.01); *H01R 13/4364* (2013.01);
(Continued)

(58) Field of Classification Search
CPC . B60L 53/16; H01R 13/2471; H01R 13/4364; H01R 13/6272; H01R 13/62944;
(Continued)

(56) References Cited

U.S. PATENT DOCUMENTS 8,936,482 B2    1/2015    Smith et al.
9,088,104 B2    7/2015    Kahara et al.
(Continued)

FOREIGN PATENT DOCUMENTS

CN    103132807 A    6/2013
CN    102709754 B    5/2014
(Continued)

OTHER PUBLICATIONS

International Search Report issued in International Patent Application No. PCT/JP2018/036804, dated Dec. 25, 2018, along with an English translation thereof.
(Continued)

*Primary Examiner* — Travis S Chambers
(74) *Attorney, Agent, or Firm* — Greenblum & Bernstein, P.L.C.

(57) ABSTRACT

A locking pin driving mechanism includes a motor, a preceding gear, a round gear, a feed screw and a slider. The feed screw is coaxially fixed to the round gear. A locking pin is mounted in the slider. A center axis of the locking pin and a center axis of the feed screw are each disposed in parallel with a center axis of a vehicle inlet. An interaxial distance between the center axis of the vehicle inlet and the center axis of the feed screw is set to be larger than an interaxial distance between the center axis of the vehicle inlet and the center axis of the locking pin.

6 Claims, 20 Drawing Sheets

(51) Int. Cl.
*H01R 13/436* (2006.01)
*H01R 13/627* (2006.01)
*H01R 13/629* (2006.01)
*H01R 13/639* (2006.01)

(52) U.S. Cl.
CPC ... *H01R 13/6272* (2013.01); *H01R 13/62944* (2013.01); *H01R 13/639* (2013.01)

(58) Field of Classification Search
CPC ... H01R 13/639; Y02T 10/70; Y02T 10/7072; Y02T 90/14; B60K 1/04
See application file for complete search history.

(56) References Cited

U.S. PATENT DOCUMENTS

| | | |
|---|---|---|
| 9,457,675 B2 | 10/2016 | Fukai et al. |
| 9,895,987 B2 | 2/2018 | Uchiyama et al. |
| 10,411,555 B2 | 9/2019 | Kim et al. |
| 2013/0137286 A1 | 5/2013 | Smith et al. |
| 2014/0170889 A1 | 6/2014 | Kahara et al. |
| 2015/0035478 A1 | 2/2015 | Uchiyama et al. |
| 2015/0343913 A1 | 12/2015 | Fukai et al. |
| 2018/0219447 A1 | 8/2018 | Kim et al. |

FOREIGN PATENT DOCUMENTS

| | | |
|---|---|---|
| CN | 104169122 A | 11/2014 |
| CN | 105958273 A | 9/2016 |
| CN | 106961052 A | 7/2017 |
| CN | 107196136 A | 9/2017 |
| CN | 108028572 | 5/2018 |
| JP | 2011-81952 A | 4/2011 |
| JP | 2012-209098 A | 10/2012 |
| JP | 2014-118693 A | 6/2014 |
| JP | 2014-120230 | 6/2014 |
| JP | 2014-120421 A | 6/2014 |
| JP | 2016-85786 | 5/2016 |
| JP | 5926173 B2 | 5/2016 |

OTHER PUBLICATIONS

Written Opinion of the International Searching Authority issue in International Application No. PCT/JP2018/036804, dated Dec. 25, 2018, along with an English translation thereof.
Supplemental Search Report issued in China Patent Application No. 201880066458.3, dated Mar. 10, 2021, along with an English translation thereof.
Office Action issued in India Counterpart Patent Appl. No. 202017015712, dated Dec. 31, 2020.
China First Office Action and Search Report issued in CN Appl. No. 201880066458.3, dated Nov. 3, 2020 and English translation.

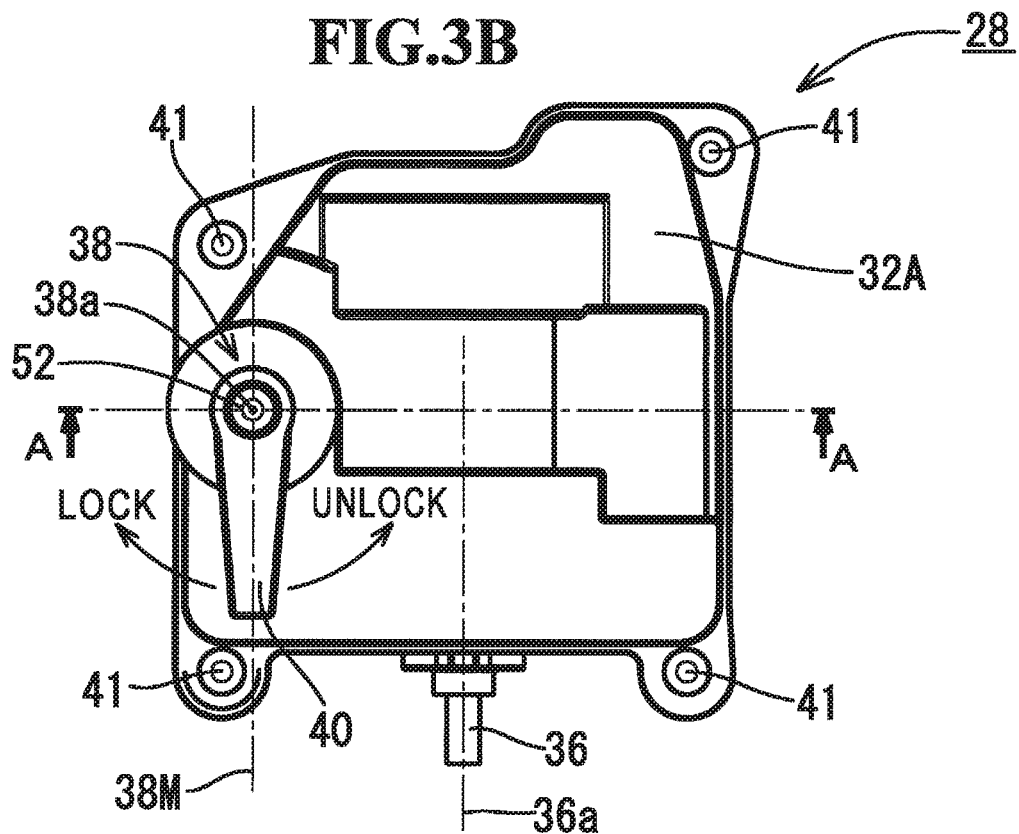
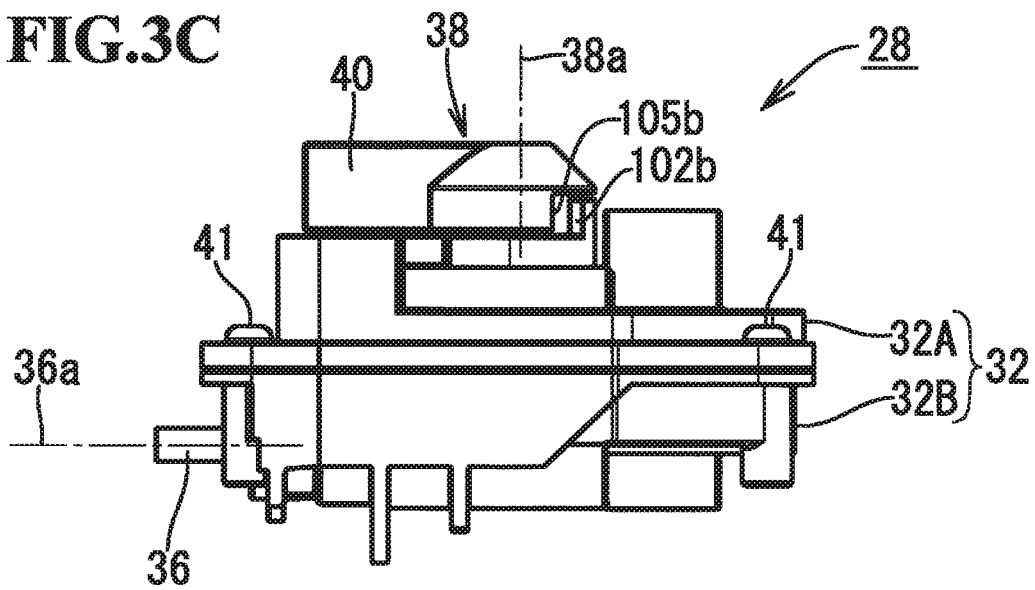

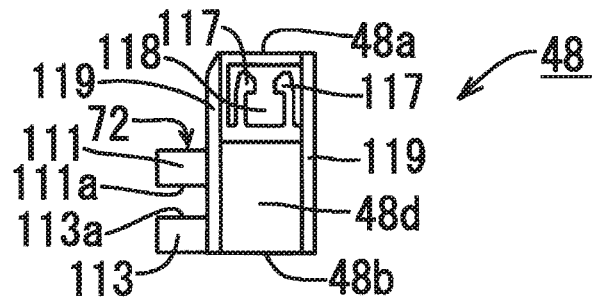
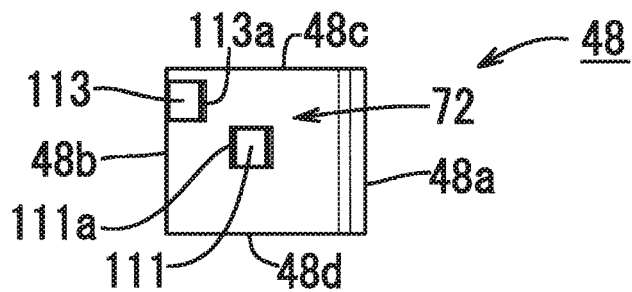
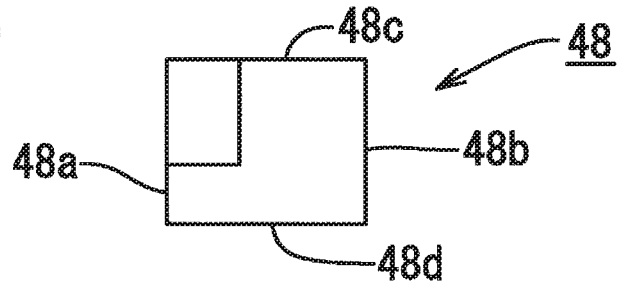
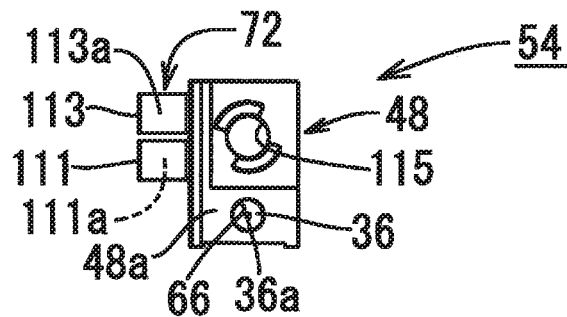

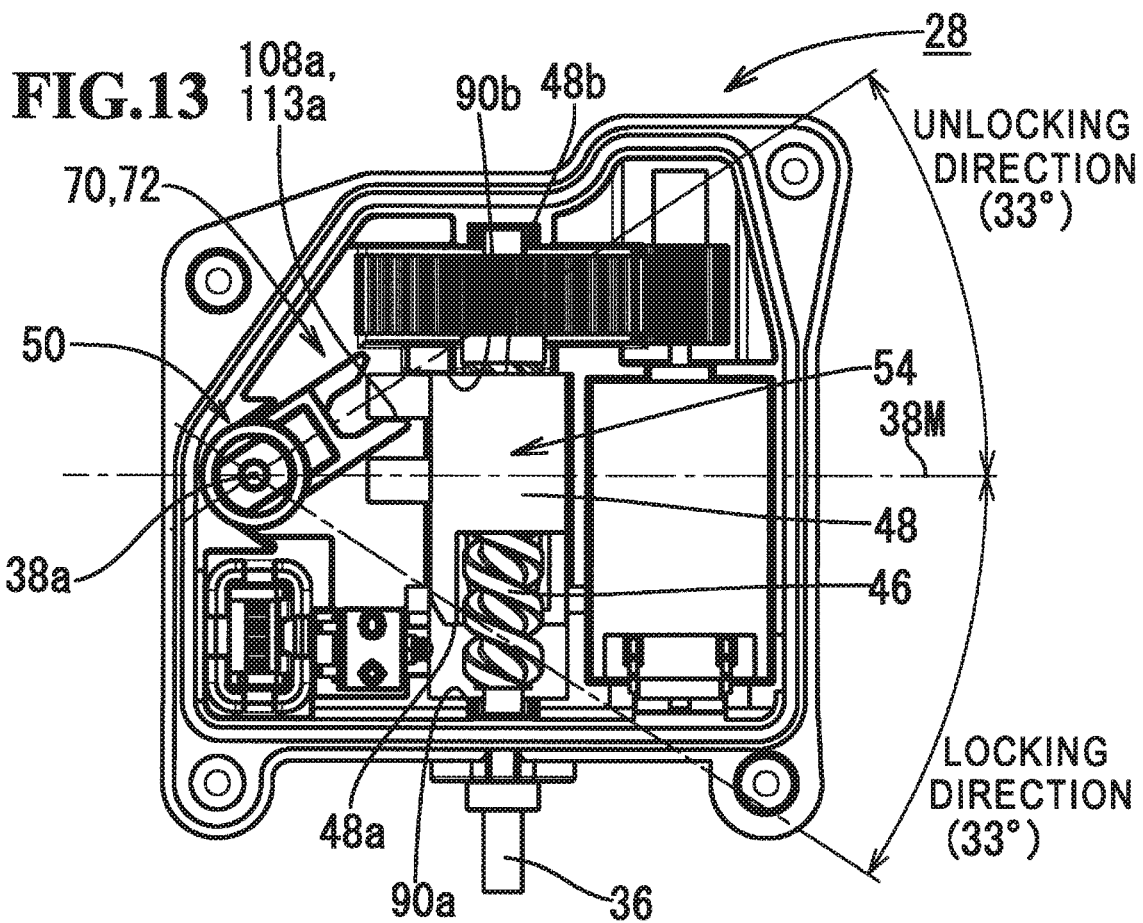
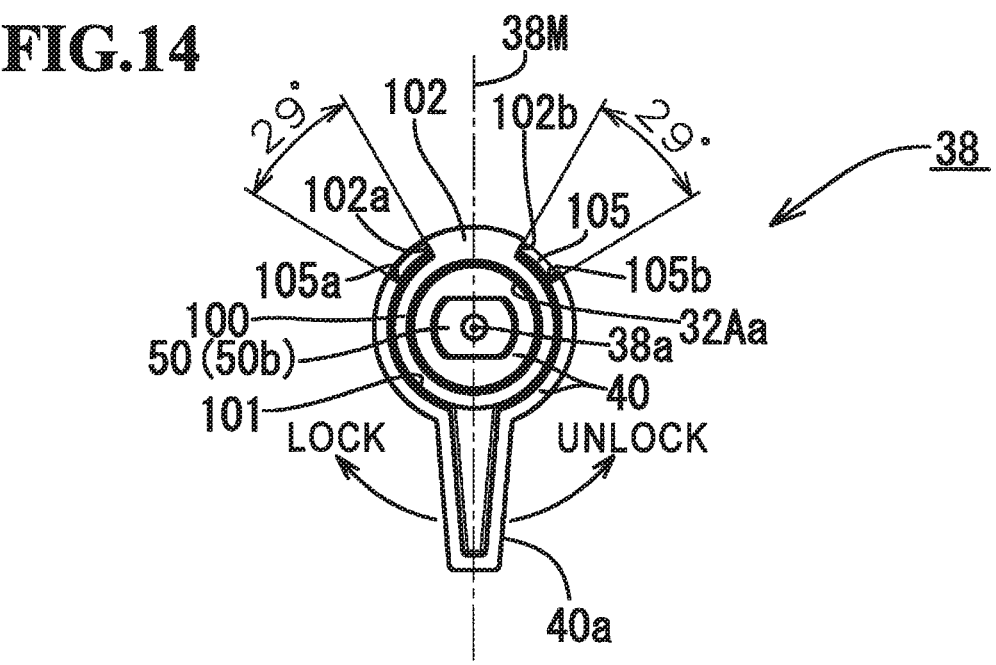

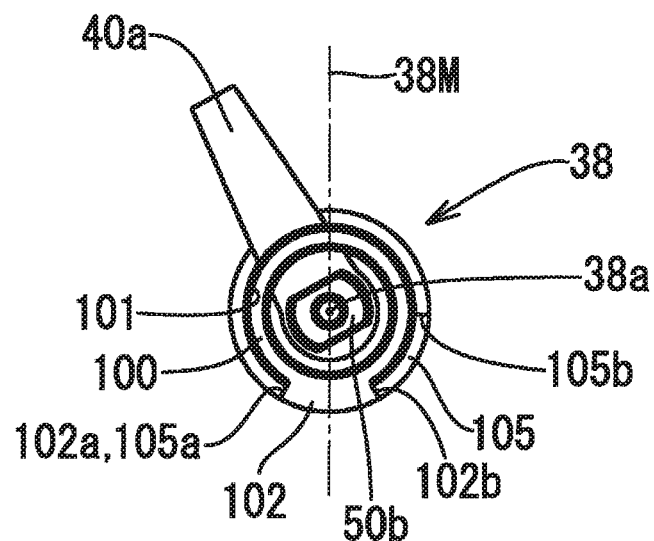
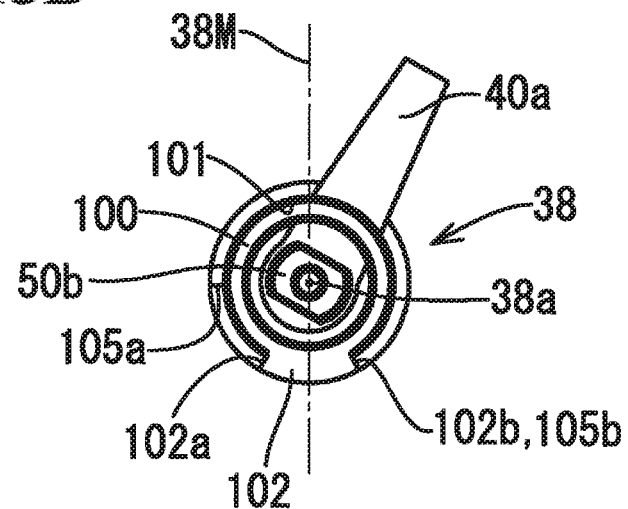

PORT LOCKING ACTUATOR DEVICE FOR VEHICLE INLET

The disclosure of Japanese Patent Application No. JP2017-197233 filed on Oct. 10, 2017 including the specification, drawings, claims and abstract is incorporated herein by reference in its entirety.

TECHNICAL FIELD

The present invention relates to a port locking actuator device for a vehicle inlet, the port locking actuator device enabling a locking pin driving mechanism of the port locking actuator device to be provided with a simple configuration.

BACKGROUND ART

In each of electric vehicles (including plug-in hybrid vehicles, etc.), a vehicle inlet is a charging port equipped in the vehicle in order to charge drive power from external power supply equipment to an in-vehicle power storage device (which refers to any of secondary batteries and other power storage function-equipped elements and devices in general) via a contact charging method. In other words, a charging connector at a distal end of a charging cable of the external power supply equipment is removably connected to the vehicle inlet and power is charged from the external power supply equipment to the in-vehicle power storage device passing sequentially through the charging cable, the charging connector and the vehicle inlet, etc. In order to prevent the charging connector from being mistakenly removed during charging, the vehicle inlet is equipped with a port locking actuator device. The port locking actuator device electrically locks connection between the vehicle inlet and the charging connector (that is, prevents disconnection) and unlocks the connection (that is, enables disconnection). Locking/unlocking is performed by reversibly displacing a locking displaceable element having an appropriate configuration (e.g., a locking pin) to a locked position and an unlocked position. In other words, the locking displaceable element engages with the part of the connection between the vehicle inlet and the charging connector at the locked position to prevent cancellation of the connection between the vehicle inlet and the charging connector (locked state). Also, the locking displaceable element is retracted from the part of the connection between the vehicle inlet and the charging connector at the unlocked position to allow cancellation of the connection between the vehicle inlet and the charging connector (unlocked state).

Examples of conventional port locking actuator devices are disclosed in Patent Literatures 1 to 4 indicated below. Each of the port locking actuator devices described in Patent Literatures 1 to 4 acts on a latch disposed at a charging connector to prevent a latched state (state of hooking the latch) from being cancelled mistakenly. The latch is intended to hold connection of the charging connector to a vehicle inlet by engaging a claw of the latch with an engagement protrusion (latch engagement portion) formed at an outer peripheral surface of a vehicle inlet from the outer circumferential side (that is, prevent the charging connector from being pulled off from the vehicle inlet, by hooking the latch). The latch is retracted outwardly by operating (pressing) a latch release button (latch release operation section) provided at the charging connector. Consequently, the claw of the latch is disengaged from the engagement protrusion, enabling the charging connector to be pulled off from the vehicle inlet.

Each of the port locking actuator devices described in Patent Literatures 1 to 4 includes a locking pin (locking displaceable element) and a locking pin driving mechanism. When performing charge, the locking pin driving mechanism electrically makes the locking pin project in an axis direction of the locking pin to displace the locking pin to a position adjacent to a back surface of the latch (locked position). Consequently, even if the latch release button is mistakenly operated during charging, the latch cannot be retracted outward because of the latch coming into abutment with the locking pin and the latch is thus prevented from being removed from the engagement protrusion. In other words, the connection between the charging connector and the vehicle inlet is locked. Also, after an end of the charging, the locking pin driving mechanism electrically retracts the locking pin in the axis direction of the locking pin to displace the locking pin at a position retracted from the back surface of the latch (unlocked position). Consequently, the charging connector can be removed from the vehicle inlet by operating the latch release button to retract the latch outwardly and thereby remove the latch from the engagement protrusion. In other words, the connection between the charging connector and the vehicle inlet is unlocked.

Citation List

Patent Literature

Patent Literature 1: Japanese Patent No. 5926173
Patent Literature 2: Japanese Patent Laid-Open No. 2012-209098
Patent Literature 3: Japanese Patent Laid-Open No. 2014-118693
Patent Literature 4: Japanese Patent Laid-Open No. 2014-120421

SUMMARY OF INVENTION

Technical Problem

There are various styles of disposition of the locking pin relative to a direction of insertion/removal of the charging connector to/from the vehicle inlet (the direction corresponding to a direction along a center axis of at least a distal end of the vehicle inlet). For example, in the port locking actuator device described in Patent Literature 1, the axis of the locking pin is disposed in a direction horizontal and perpendicular to the insertion/removal direction of the charging connector. Also, in each of the port locking actuator devices described in Patent Literatures 2 and 3, the axis of the locking pin is disposed in a direction vertical and perpendicular to the insertion/removal direction of the charging connector. Also, in the port locking actuator device described in Patent Literature 4, the axis of the locking pin is disposed in a direction parallel to the insertion/removal direction of the charging connector.

The latch of the charging connector is disposed at an upper portion of the charging connector at a center in a width direction in a section orthogonal to the axis of the distal end of the charging connector. Therefore, with the manner of disposition of the locking pin described in Patent Literature 1, in order to displace the locking pin in the width direction to bring the locking pin to the position of the latch, inevitably, the locking pin needs to be long and an amount of displacement of the locking pin between the locked position and the unlocked position needs to be large. Also, with the manner of disposition of the locking pin described in each of Patent Literatures 2 and 3, the axis of the locking pin is disposed in the vertical direction at a position close to the distal end of the vehicle inlet to displace the locking pin in the vertical direction. As a result, a dimension in the vertical direction of the port locking actuator device inevitably becomes large at the position close to the distal end of the vehicle inlet. Therefore, where a space for disposition of the port locking actuator device, the space being wide in the vertical direction, cannot be secured at the position close to the distal end of the vehicle inlet, this manner of disposition cannot be employed.

On the other hand, with a manner of disposition of the locking pin described in Patent Literature 4, the aforementioned problems in the disposed positions of the locking pins described in Patent Literatures 1 to 3 hardly occur. However, the locking pin driving mechanism described in Patent Literature 4 needs a complex configuration using a cam.

The present invention relates to a port locking actuator device having a structure in which an axis of a locking pin is disposed in a direction parallel to an insertion/removal of a charging connector, like the port locking actuator device described in Patent Literature 4. The present invention solves the aforementioned problem in the port locking actuator device described in Patent Literature 4 and enables a locking pin driving mechanism to be provided with a simple configuration by eliminating the need for a cam. The present invention also solves a new problem accompanied by eliminating the need for a cam.

Solution to Problem

A port locking actuator device according to the present invention is a port locking actuator device for locking a state in which a charging connector is connected to a vehicle inlet that allows the charging connector to be removably connected thereto, the port locking actuator device being installed at the vehicle inlet, wherein: the charging connector and the vehicle inlet include a latch device that inhibits or allows pull-out of the charging connector connected to the vehicle inlet; the latch device includes a latch and a latch release operation section included in the charging connector and a latch engagement portion included in an outer peripheral surface of the vehicle inlet; the latch device inhibits pull-out of the charging connector by the latch being engaged with the latch engagement portion from an outer peripheral side of the vehicle inlet with the charging connector connected to the vehicle inlet, and allows pull-out of the charging connector by the latch release operation section being operated to retract the latch outwardly from that state and the engagement being thereby cancelled; the port locking actuator device includes a locking pin and a locking pin driving mechanism; the locking pin driving mechanism electrically makes the locking pin project in an insertion/removal direction of the charging connector to dispose the locking pin at a predetermined locked position adjacent to a back surface of the latch and thereby inhibits the latch from being retracted outwardly, and electrically retracts the locking pin in the insertion/removal direction of the charging connector from that state to dispose the locking pin at a predetermined unlocked position retracted from the back surface of the latch and thereby allows the latch to be retracted outwardly; the locking pin driving mechanism include a motor, a preceding gear to be driven by the motor, a round gear that meshes with the preceding gear, a feed screw coaxially fixed to the round gear, and a slider threadably connected to the feed screw; the locking pin is mounted in the slider; a center axis of the locking pin and a center axis of the feed screw are each disposed in parallel with a center axis of the vehicle inlet that is parallel to the insertion/removal direction of the charging connector; and a positional relationship between the feed screw and the locking pin relative to the vehicle inlet is set in such a manner that an interaxial distance between the center axis of the vehicle inlet and the center axis of the feed screw is larger than an interaxial distance between the center axis of the vehicle inlet and the center axis of the locking pin.

The present invention enables the locking pin driving mechanism to be provided with a simple configuration by eliminating the need for a cam. Here, in a locking pin driving mechanism, in order to obtain a driving force necessary for displacing a locking pin, there is a demand for forming a round gear so as to have a large diameter to obtain a large reduction ratio. However, where a center axis of a feed screw (that is, a center axis of the round gear) is disposed in parallel with a center axis of a vehicle inlet as with the present invention, if the round gear is formed so as to have a large diameter, a new problem of the round gear interfering with an outer sleeve of the vehicle inlet occurs. Disposing the locking pin and the round gear at respective positions that are outwardly away from the outer sleeve of the vehicle inlet enables forming the round gear so as to have a large diameter without interfering with the outer sleeve of the vehicle inlet. However, where a distance between the vehicle inlet center axis and the locking pin is specified in a standard, such disposition cannot be employed. Also, a driving force necessary for displacing the locking pin can be obtained by increasing the number of gears between a motor and the round gear instead of forming the round gear so as to have a large diameter. However, in such case, the number of gears is increased, resulting in complexity in configuration. Therefore, in the present invention, the positional relationship between the feed screw and the locking pin relative to the vehicle inlet is set in such a manner that the interaxial distance between the center axis of the vehicle inlet and the center axis of the feed screw is larger than the interaxial distance between the center axis of the vehicle inlet and the center axis of the locking pin. Consequently, the round gear can be formed so as to have a large diameter without interfering with the outer sleeve of the vehicle inlet. As a result, the number of gears between the motor and the round gear can be made small by setting a large reduction ratio between the round gear and the preceding gear meshing with the round gear, enabling the electrical driving mechanism for the locking pin to be provided with a simpler configuration. Note that although each of the locking pin driving mechanisms described in Patent Literatures 1 to 4 includes a spur gear or a worm wheel as the round gear, with the disposition of the round gear in Patent Literatures 1 to 4, even if the round gear is formed so as to have a large diameter, no problem of the round gear interfering with the outer sleeve of the vehicle inlet occurs. The problem of the round gear interfering with the outer sleeve of the vehicle inlet occurs only with the disposition of the round gear in the present invention. Also, according to the present invention, the locking pin and the feed screw are disposed non-coaxially, and thus, unlike a case where a locking pin and a feed screw are disposed coaxially, the locking pin can be displaced so as to pass the feed screw (that is, respective areas in the axis directions of the locking pin and the feed screw overlap each other). Consequently, a design that makes a total length of an assembled component of the locking pin, the slider and the feed screw short becomes possible, enabling a decrease in dimension of the port locking actuator device in the axis direction of the locking pin and the feed screw. As a result, even if a space for disposing the port locking actuator device is small in a direction along the center axis of the vehicle inlet, the port locking actuator device can easily be disposed.

In the present invention, it is possible that the locking pin is mounted in the slider so as to orient toward a direction opposite to a direction from the slider toward the round gear. Accordingly, the locking pin can be disposed without interfering with the round gear.

In the present invention, it is possible that the locking pin is disposed at a position at which the center axis of the locking pin falls within a plane of the round gear. Accordingly, the interaxial distance between the locking pin and the feed screw is short in comparison with a case where a locking pin is disposed at a position at which a center axis of the locking pin falls outside a plane of a round gear. Consequently, a section, in a direction orthogonal to the center axis of the feed screw, of the slider can be made small, enabling forming the slider so as to have a smaller size. Furthermore, the locking pin can be disposed at a position at which an entire diameter of the locking pin falls within the plane of the round gear. Consequently, the interaxial distance between the locking pin and the feed screw becomes shorter, enabling the section, in the direction orthogonal to the center axis of the feed screw, of the slider to be further smaller. Therefore, the slider can be formed so as to have a further smaller size.

In the present invention, it is possible that in a plane orthogonal to the respective center axes of the vehicle inlet, the locking pin and the feed screw, respective positions of the three center axes are aligned on a straight line. Here, it is assumed that a position of the center axis of the feed screw is disposed off a straight line connecting the center axis of the vehicle inlet and the center axis of the locking pin with the interaxial distance between the vehicle inlet and the locking pin and the interaxial distance between the locking pin and the feed screw kept at respective fixed values. In this case, the interaxial distance between the vehicle inlet and the feed screw is inevitably short in comparison with a case where the position of the center axis of the feed screw is disposed on the straight line. As a result, the round gear becomes closer to, and thus easily interfere with, the outer sleeve of the vehicle inlet. In order to avoid the interference, it is necessary to make the round gear have a small diameter. Accordingly, aligning the respective center axes of the vehicle inlet, the locking pin and the feed screw on a straight line can be considered advantageous for making the round gear have a large diameter.

In the present invention, it is possible that the preceding gear is a gear directly coupled to the motor. Accordingly, only one preceding gear is interposed between the motor and the round gear, enabling the electrical driving mechanism for the locking pin to be provided with a simple configuration. In the present invention, it is possible that each of the preceding gear and the round gear is a spur gear. Accordingly, a rotation axis of the motor can be disposed in parallel with the center axis of the locking pin and the center axis of the feed screw, enabling forming the port locking actuator device so as to have a flattened shape in entirety.

BRIEF DESCRIPTION OF DRAWINGS

FIG. 3B is a plan view of the port locking actuator device.

FIG. 3C is a right side view of the port locking actuator device.

FIG. 11D is a bottom view of the slider.

FIG. 11E is a left side view of the slider alone.

FIG. 11F is a right side view of the slider alone.

FIG. 12A is a front view of a locking displaceable element formed by assembling the slider and the locking pin each illustrated in FIG. 5.

FIG. 13 is a plan view illustrating the port locking actuator device illustrated in FIG. 2 with the upper housing and the operation knob removed and indicates a rotational angle range of the rotary shaft alone with the operation knob not assembled thereto. The rotary shaft is illustrated in a state in which the rotary shaft is mechanically stopped at an unlocked position.

FIG. 14 is an arrow B-B sectional view of FIG. 3A and indicates a rotational angle range of a manual operation element.

FIG. 15A is an arrow B'-B' sectional view of FIG. 3A and illustrates a state in which the manual operation element has been subjected to a locking operation.

FIG. 15B is an arrow B'-B' sectional view of FIG. 3A and illustrates a state in which the manual operation element has been subjected to an unlocking operation.

DESCRIPTION OF EMBODIMENT

An embodiment of the present invention will be described below. Here, a case where the present invention is applied to an alternate-current normal charging system complying with the IEC standard "IEC 62196 TYPE 1" and the SAE standard "SAE J1772" will be described. Also, here, with respect to a port locking actuator device (hereinafter may be abbreviated as "actuator device"), a "front surface" refers to a surface with a distal end of a locking pin viewed at the front in a position in which the actuator device is mounted in a vehicle. Also, with respect to the actuator device, directions, top (upper or up), bottom (lower or down), left, right, front and rear, refer to directions with reference to the "front surface" of the actuator device. Also, for each of components of the actuator device, top (upper or up), bottom (lower or down), left, right, front and rear, refer to directions with reference to the "front surface" of the actuator device in a position in which the component is mounted in the actuator device (that is, the component is in the position illustrated in FIG. 5).

Figure 1:
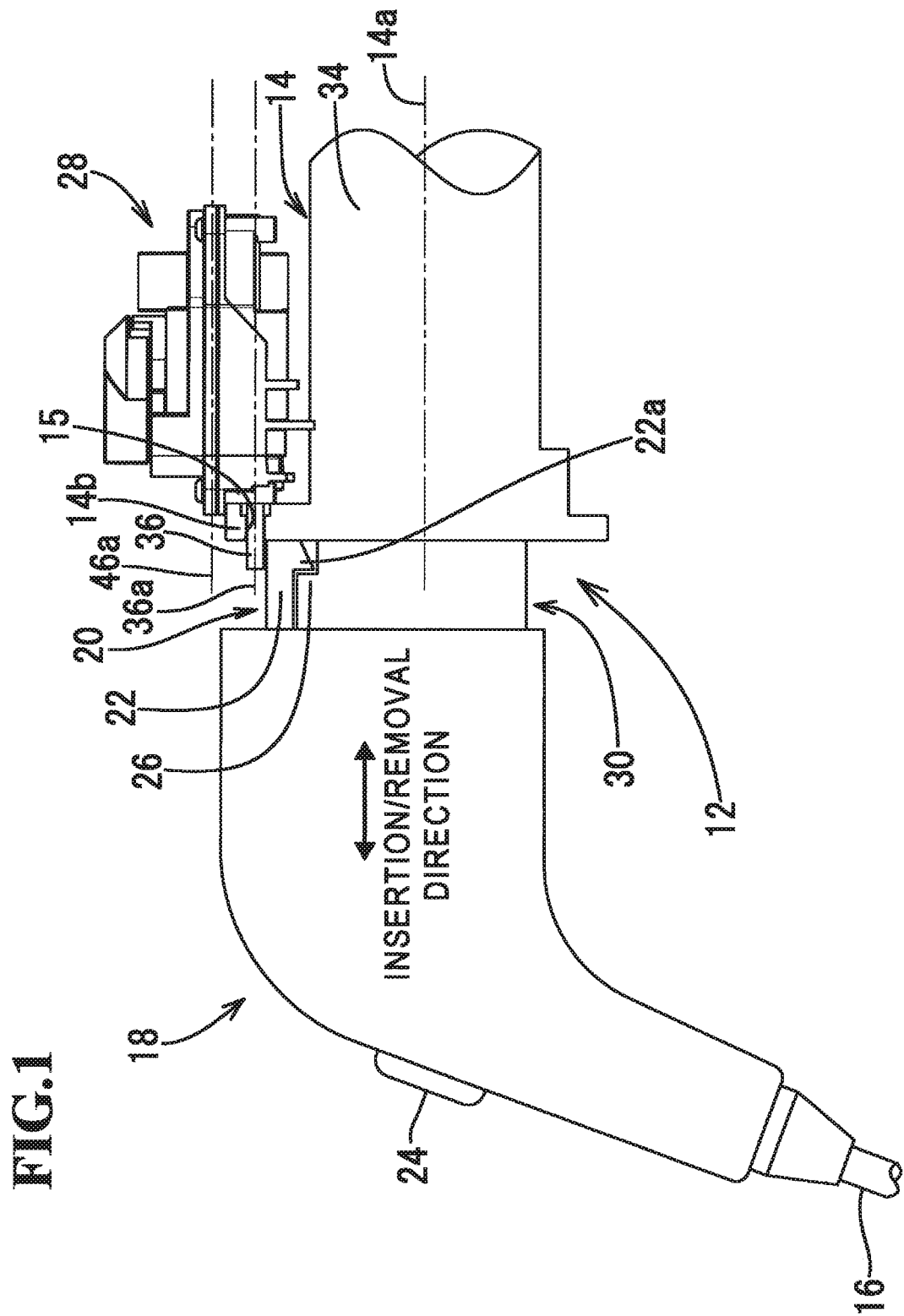
FIG. 1 is a right side view illustrating a state in which a charging connector is connected to a vehicle inlet equipped with a port locking actuator device according to an embodiment of the present invention and the connection is locked.

FIG. 1 illustrates a state in which a charging connector is connected to a vehicle inlet and the connection is locked. Upon a charging port lid (not illustrated) provided in a body of a vehicle being opened, a charging port 12 is exposed to the outside. A vehicle inlet 14 for charging is fixedly provided in the charging port 12. On the other hand, a charging connector 18 is provided at a distal end of a charging cable 16 connected to external power supply equipment (not illustrated). The charging connector 18 is connected to the vehicle inlet 14 so as to be removable in a direction along a center axis 14a of the vehicle inlet 14. Consequently, an alternate-current voltage is supplied from the external power supply equipment to an in-vehicle charger (not illustrated) passing sequentially through the charging cable 16, the charging connector 18 and the vehicle inlet 14. The alternate-current voltage is converted into a direct-current voltage in the in-vehicle charger and the direct-current voltage is supplied to an in-vehicle secondary battery and the in-vehicle secondary battery is thereby charged.

A latch device 20 for inhibiting or allowing pull-out of the charging connector 18 connected to the vehicle inlet 14 is disposed between the vehicle inlet 14 and the charging connector 18. In other words, the latch device 20 includes a latch 22 and a latch release operation section 24 (push button) provided in the charging connector 18, and a latch engagement portion 26 (engagement protrusion) provided in an outer peripheral surface of the vehicle inlet 14. The latch device 20 inhibits pull-out of the charging connector 18 from the vehicle inlet 14 by a claw 22a of the latch 22 being engaged with the latch engagement portion 26 from the outer peripheral side of the vehicle inlet 14, via a spring force, in a state in which the charging connector 18 connected to the vehicle inlet 14. Also, upon the latch release operation section 24 being pressed against the spring force in the latched state and the latch 22 being thereby retracted outwardly, the engagement is cancelled (the latch is released), allowing pull-out of the charging connector 18.

In order to prevent the charging connector 18 from being removed because of the latch release operation section 24 being mistakenly operated during charging, the vehicle inlet 14 is equipped with a port locking actuator device 28. Normally, a locking operation and an unlocking operation of the actuator device 28 are performed electrically; however, the actuator device 28 is configured so that a locking operation and an unlocking operation of the actuator device 28 can also be performed manually, as an emergency action. Therefore, for example, even if the actuator device 28 cannot be switched from a locked state to an unlocked state electrically after an end of charging because of, e.g., a failure of the actuator device 28, the actuator device 28 can be switched from a locked state to an unlocked state manually. Consequently, the charging connector 18 can be removed from the vehicle inlet 14. Also, when the charging connector 18 is connected to the vehicle inlet 14 in order to perform charging, the actuator device 28 may fail to be switched from an unlocked state to a locked state electrically because of, e.g., a failure of the actuator device 28. Upon occurrence of such failure, a charging device does not start charging because the charging device cannot detect completion of locking. Even in such case, switching from an unlocked state to a locked state is performed manually to make the charging device detect completion of locking, enabling start charging.

The actuator device 28 is mounted on an upper surface of an outer sleeve (casing) 34 of the vehicle inlet 14 and attached and fixed to the outer sleeve 34 via screw-fastening (screw-fastening positions not illustrated). A locking pin 36 projects from a front surface of the actuator device 28. The locking pin 36 is disposed so as to move in and out toward a connection part 30 of the connection between the vehicle inlet 14 and the charging connector 18 from a locking pin moving in-and-out hole 15 (see FIG. 16A) formed in a flange 14b at a front end of the vehicle inlet 14. The actuator device 28 electrically locks the charging connector 18 connected to the vehicle inlet 14 (that is, prevents cancellation of the connection) and electrically unlock the charging connector 18 (that is, allows cancellation of the connection). In other words, after the charging connector 18 is connected to the vehicle inlet 14, the actuator device 28 electrically causes the locking pin 36 to project in an insertion/removal direction of the charging connector 18 (that is, the direction along the center axis 14a of the outer sleeve 34 of the vehicle inlet 14), before a start of charging. Consequently, the actuator device 28 causes the locking pin 36 to be disposed at a locked position adjacent to a back surface of the latch 22 (that is, the position illustrated in FIG. 1). As a result, even if the latch release operation section 24 is mistakenly operated, the latch 22 comes into abutment with the locking pin 36 and is thus inhibited from retracting outward. Therefore, the engagement between the latch 22 and the latch engagement portion 26 is not cancelled, and as a result, the charging connector 18 cannot be pulled out from the vehicle inlet 14. Also, after an end of charging, the locking pin 36 is electrically retracted in the insertion/removal direction of the charging connector 18, to dispose the locking pin 36 at an unlocked position retracted from the back surface of the latch 22 (here, the position illustrated in FIG. 16B at which a distal end surface of the locking pin 36 does not project from a distal end surface of the vehicle inlet 14). Consequently, upon the latch release operation section 24 being pressed, the latch 22 is retracted outwardly and the engagement between the latch 22 and the latch engagement portion 26 is thereby cancelled. As a result, the charging connector 18 can be pulled out from the vehicle inlet 14. The center axis 14a of the vehicle inlet 14, a center axis 36a of the locking pin 36 and a center axis 46a of a later-described feed screw 46 (FIG. 5) are each disposed in parallel with the insertion/removal direction of the charging connector 18.

Figure 2:
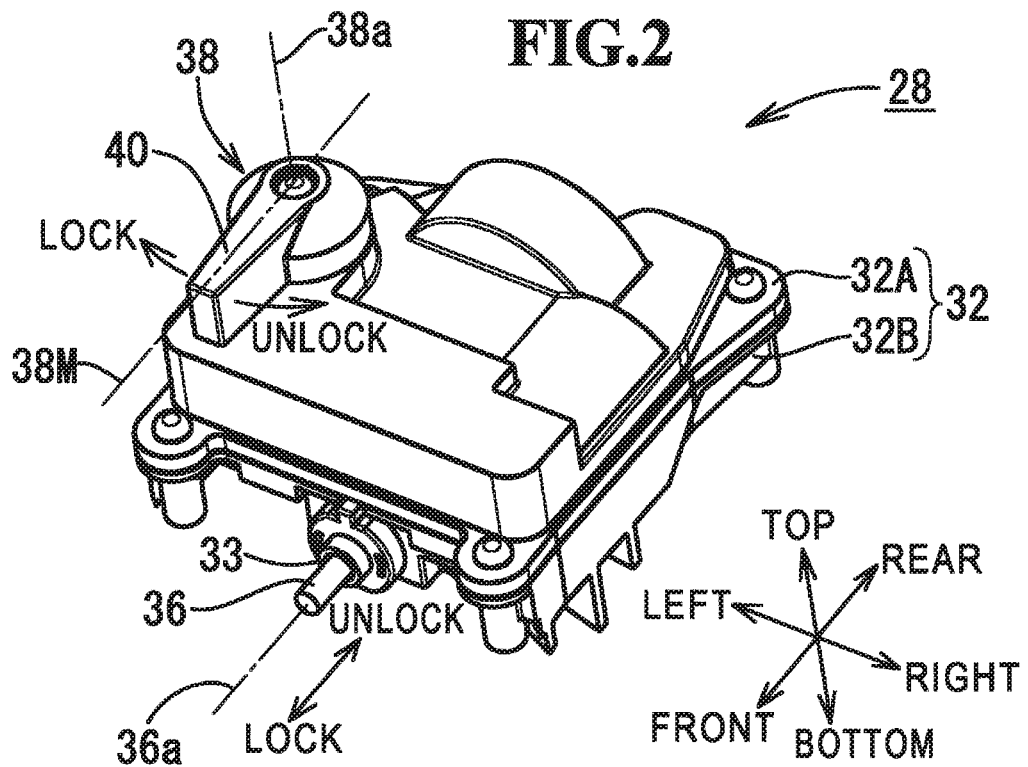
FIG. 2 is a perspective diagram of the port locking actuator device according to the embodiment of the present invention as viewed obliquely from the right upper front side. A manual operation element is illustrated in an intermediate position in a rotation range and a locking pin is illustrated in an unlocked position, respectively. Illustration of a part of the device, the part being attached to a vehicle inlet outer sleeve, is omitted.
Figure 3A:
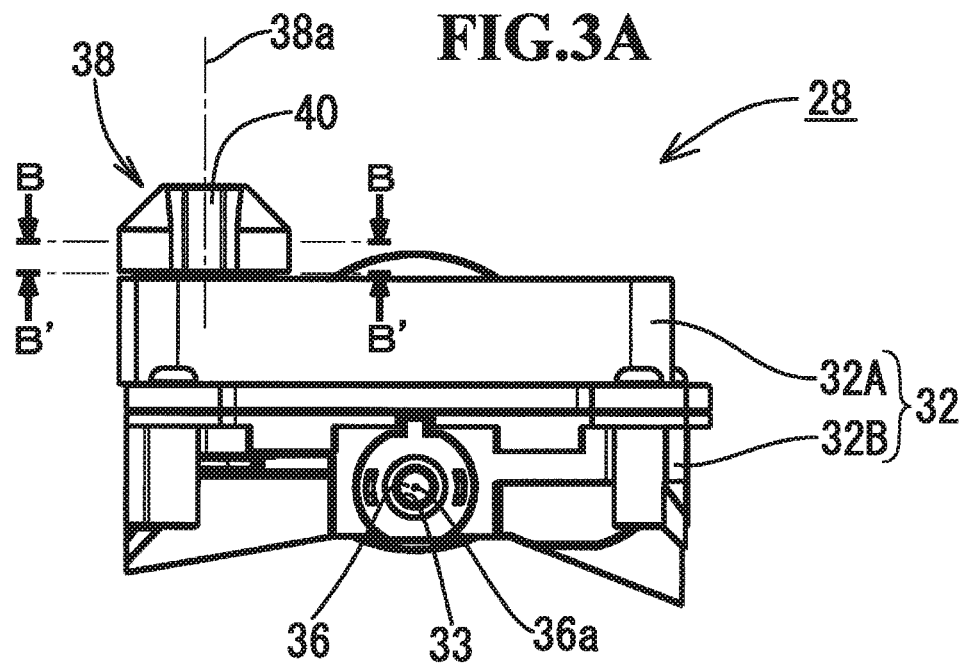
FIG. 3A is a front view of the port locking actuator device illustrated in FIG. 2.

FIGS. 2 and 3 each illustrate an overall appearance of the actuator device 28. The actuator device 28 includes a housing 32. The housing 32 has a substantially quadrilateral shape as a whole in plan view. The actuator device 28 has a structure in which a part (that is, a part to be disposed inside the housing 32) of a later-described manual driving mechanism 68 (FIG. 5) and a later-described electrical driving mechanism 60 (FIG. 5) are housed in a water-tight manner inside the housing 32. An operation knob 40 of the manual driving mechanism 68 is disposed so as to be exposed in a space outside the housing 32. The housing 32 forms a fixed portion. The fixed portion is a part that is immovable relative to the vehicle inlet 14 and displaceably supports respective movable portions such as a manual operation element 38 and a locking displaceable element 54, which will be described later. Fixing parts (not illustrated) for fixing the actuator device 28 to the outer sleeve 34 of the vehicle inlet 14 via, e.g., screw-fastening are formed in a lower portion of the housing 32. A locking pin projection hole 33 is formed in a center in a width direction of a front surface of the housing 32. The locking pin 36 displaceably projects from the locking pin projection hole 33. In other words, the locking pin 36 is disposed inside the housing 32 so as to be displaceable in the direction along the center axis 36a of the locking pin 36. The direction of displacement of the locking pin 36 is a direction orthogonal to the front surface of the housing 32 and is the insertion/removal direction of the charging connector 18. A distal end of the locking pin 36 projects forward from the front surface of the housing 32 (that is, toward the near side from the surface of the sheet of FIG. 3A). The locking pin 36 is driven electrically or manually to be displaced to a locked position at which the locking pin 36 projects relative to the housing 32 (that is, the position illustrated in FIGS. 1, 17 and 19) and an unlocked position at which the locking pin 36 is retracted relative to the housing 32 (position illustrated in FIGS. 2, 3, 16B, 18 and 20). The operation knob 40 of the manual operation element 38 is disposed at an upper surface of the housing 32. The operation knob 40 is disposed in such a manner that the operation knob 40 can be rotated relative to the housing 32, in a direction around a rotation axis 38a orthogonal to the upper surface of the housing 32, via manual operation. The operation knob 40 can be rotated around the rotation axis 38a by a predetermined angle in opposite, right and left, directions relative to an intermediate position (that is, the position illustrated in FIGS. 2 and 3) of a rotation range of the operation knob 40. Here, the intermediate position of the operation knob 40 illustrated in FIGS. 2 and 3 is a neutral position for manual operation, at which the operation knob 40 provides no instruction and no indication for locking or unlocking. Upon the operation knob 40 being turned clockwise, the locking pin 36 projects to the locked position.

Upon the operation knob 40 being turned counterclockwise, the locking pin 36 retracts to the unlocked position.

Figure 4:
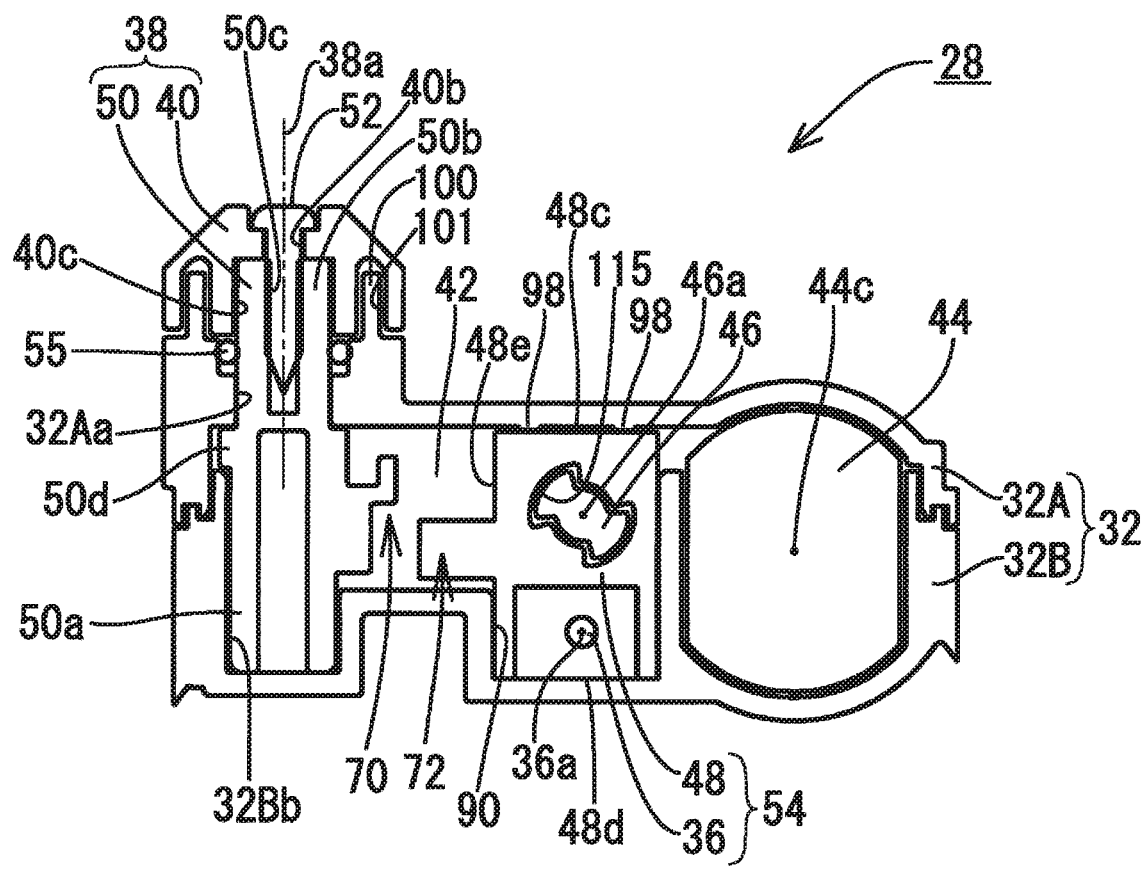
FIG. 4 is an arrow A-A sectional view of FIG. 3B.

FIG. 4 illustrates a sectional structure at the arrow A-A position in FIG. 3B. Here, the arrow A-A position is a position in a plane extending through the rotation axis 38a of the manual operation element 38 and orthogonal to the center axis 36a of the locking pin 36. The housing 32 is formed of an upper housing 32A and a lower housing 32B, which are two divisions separated from each other in a top-bottom direction. In other words, the housing 32 is formed by bonding respective peripheries of butting surfaces of the upper housing 32A and the lower housing 32B, the butting surfaces butting each other, together and screw-fastening the peripheries to integrate the upper housing 32A and the lower housing 32B. A motor 44 (direct-current motor), the feed screw 46, a slider 48, a rotary shaft 50, etc., are housed in an inner space 42 of the housing 32. The locking pin 36 is mounted in the slider 48. The locking displaceable element 54 is formed by an assembled component of the slider 48 and the locking pin 36. A rotation axis 44c of the motor 44, the center axis (rotation axis) 46a of the feed screw 46 and the center axis 36a of the locking pin 36 each extend in a direction orthogonal to the surface of the sheet of FIG. 4 and are disposed in parallel with one another. The feed screw 46 is driven to reversibly rotate, by the motor 44. The slider 48 is threadably connected to the feed screw 46. A slider receiving space 90 is formed so as to extend in a direction along the rotation axis 46a of the feed screw 46, in an inner peripheral surface of the lower housing 32B. A lower portion of the slider 48 is received in the slider receiving space 90 so as to be slidable in the extending direction of the slider receiving space 90. An upper surface 48c and a lower surface 48d of the slider 48 are disposed between respective surfaces of the upper housing 32A and the lower housing 32B, the surfaces being opposed to each other, and are loosely in abutment with and supported by the respective opposed surfaces. Upon the motor 44 being driven, the feed screw 46 rotates. Along with the rotation, the locking displaceable element 54 linearly moves forward or rearward according to a direction of the rotation of the feed screw 46 along the rotation axis 46a, with rotation in a direction around the rotation axis 46a inhibited. In this way, the locking pin 36 is displaced to the unlocked position and the locked position via electrical operation.

In FIG. 4, a lower end 50a of the rotary shaft 50 is rotatably received and supported in a recess 32Bb formed in the inner peripheral surface of the lower housing 32B. An upper portion of the rotary shaft 50 rotatably extends through a through-hole 32Aa formed in the upper housing 32A and projects to an outside space above the upper housing 32A. In the through-hole 32Aa, a seal packing 55 (O-ring) made of rubber is disposed between the upper housing 32A and the rotary shaft 50. Consequently, the inner space 42 of the housing 32 is water-tightly isolated from the outside space. The operation knob 40 is fixedly fitted to an upper end of the rotary shaft 50 via a screw 52. The manual operation element 38 is formed of an assembly component of the rotary shaft 50 and the operation knob 40. Upon the operation knob 40 being turned in an arbitrary direction in the direction around the rotation axis 38a (that is, a locking direction or an unlocking direction) from the outside of the housing 32 via manual operation, the rotary shaft 50 rotates in the same direction in the inner space 42. At a part of the rotary shaft 50, the part being disposed in the inner space 42, a manual operation element-side engagement portion 70 is formed so as to project toward the slider 48. On the other hand, at the slider 48, a locking displaceable element-side engagement portion 72 is formed so as to project toward the rotary shaft 50. The manual operation element-side engagement portion 70 and the locking displaceable element-side engagement portion 72 engage with each other in response to an operation of the manual operation element 38. In other words, upon the operation knob 40 being turned, the manual operation element-side engagement portion 70 engages with the locking displaceable element-side engagement portion 72 and presses the locking displaceable element 54 in the direction along the rotation axis 46a of the feed screw 46. A force of the pressing makes the feed screw 46 idle without being self-locked and the locking displaceable element 54 is thus transferred in the direction along the rotation axis 46a (that is, a locking direction or an unlocking direction). A lead angle of the feed screw 46 is set to an angle that prevents self-locking. In this way, the locking pin 36 is displaced to the unlocked position and the locked position via manual operation.

Figure 5:
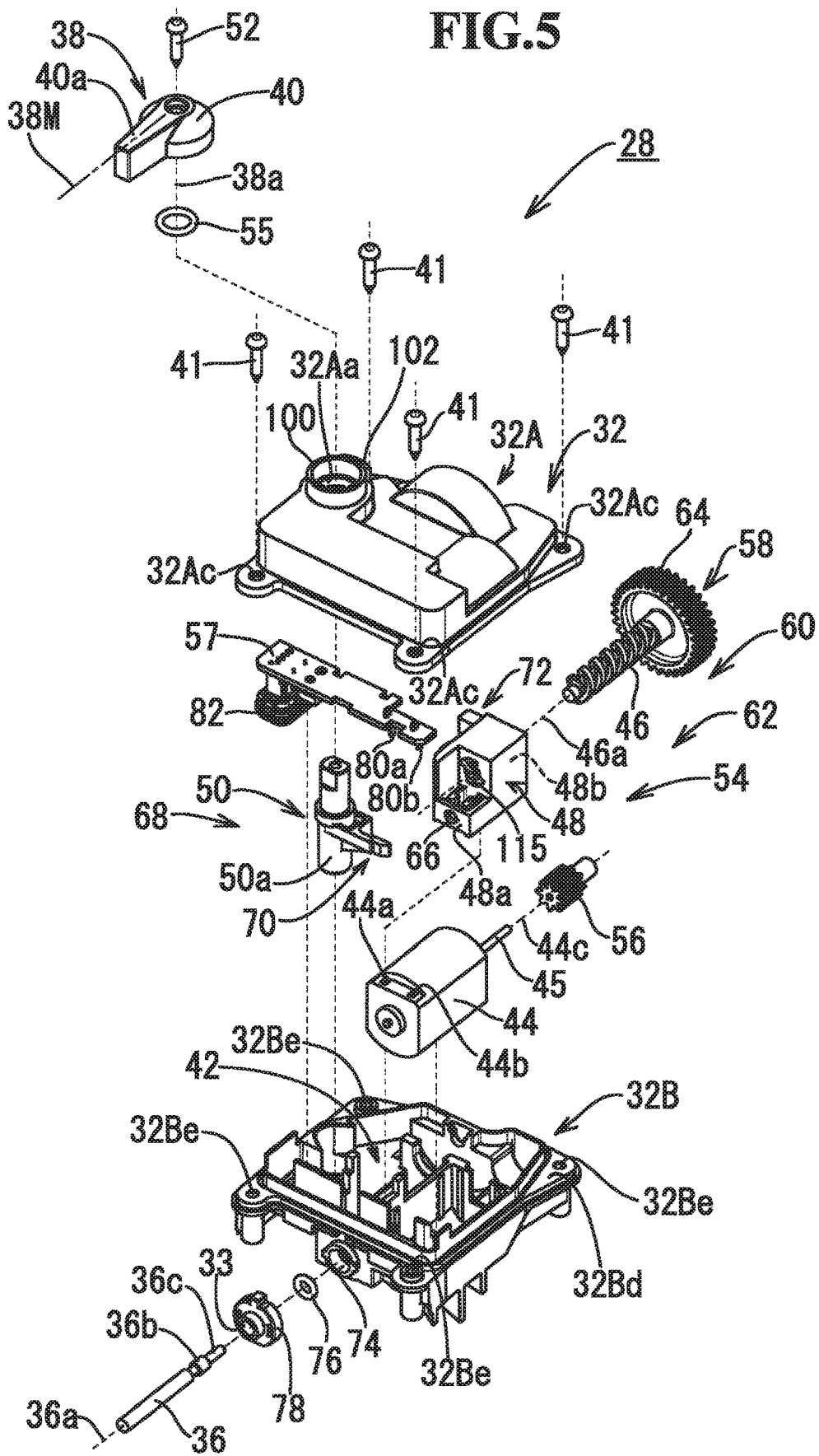
FIG. 5 is an exploded perspective diagram of the port locking actuator device illustrated in FIG. 2.

FIG. 5 illustrates the actuator device 28 dissembled into respective components. The housing 32A and the lower housing 32B forming the housing 32 are formed of respective single-piece moldings made of a same reinforced resin material such as a glass-fiber reinforced resin. The upper housing 32A and the lower housing 32B are integrated by bonding the entire peripheries of the butting surfaces of the upper housing 32A and the lower housing 32B together via an adhesive and fastening each of four parts in the entire peripheries via a screw 41, and thereby form the housing 32. The motor 44, a gear 56, a composite gear 58, the locking displaceable element 54, the rotary shaft 50, a printed board 57, etc., are received in the inner space 42 of the housing 32. The motor 44, the gear 56 and the composite gear 58 form the electrical driving mechanism 60 that reversibly displaces the locking displaceable element 54 to a locked position and an unlocked position via electrical operation. Also, the motor 44, the gear 56, the composite gear 58 and the slider 48 form a locking pin driving mechanism 62 that reversibly displaces the locking pin 36 to the locked position and the unlocked position via electrical operation. Each of the gear 56 and the composite gear 58 is formed of a single-piece molding made of a reinforced resin material such as a glass-fiber reinforced resin. The gear 56 (pinion) is fitted on and thereby directly coupled to a motor shaft 45 of the motor 44. The composite gear 58 is formed by disposing a round gear 64 and the feed screw 46 coaxially. The gear 56 and the round gear 64 are each formed of a spur gear and mesh with each other. The gear 56 forms one and only preceding gear for the round gear 64 and is disposed between the motor 44 and the round gear 64. The slider 48 is formed of a single-piece molding made of a resin such as POM (polyacetal). The slider 48 includes a female thread 115 formed so as to extend through the slider 48 in a front-rear direction. The slider 48 is threadably connected to the feed screw 46 via the female thread 115 and advances or retracts along the feed screw 46 according to a direction of rotation of the feed screw 46. As described with reference to FIG. 4, the slider 48 is received in the inner space 42 so as to be unrotatable in the direction around the rotation axis 46a of the feed screw 46. The locking pin 36 is formed of a straight stick (here, a straight round stick) of metal such as stainless steel. The locking pin 36 is fixed to the slider 48 with a rear end of the locking pin 36 inserted to a locking pin insertion hole 66 in a lower portion of a front surface of the slider 48. Consequently, the slider 48 and the locking pin 36 are integrally assembled to form the locking displaceable element 54. At this time, the center axis 36a of the locking pin 36 is disposed in parallel with a center axis of the female thread 115 of the slider 48 (in other words, the center axis 46a of the feed screw 46) at a position immediately below the female thread 115. With the above arrangement, upon the motor 44 being driven, rotation of the motor shaft 45 is transmitted to the feed screw 46 via the gear 56 and the round gear 64, and the slider 48 advances or retracts along the feed screw 46 according to a direction of rotation of the feed screw 46. Then, upon the slider 48 advancing, the locking pin 36 is displaced to the projecting locked position, and upon the slider 48 being retracted, the locking pin 36 is displaced to the retracted unlocked position. This displacement operation is performed in such a manner that the locking pin 36 and the feed screw 46 pass each other (that is, as illustrated in, e.g., FIG. 16B, respective areas in the axis directions of the locking pin 36 and the feed screw 46 overlap each other).

Figure 6:
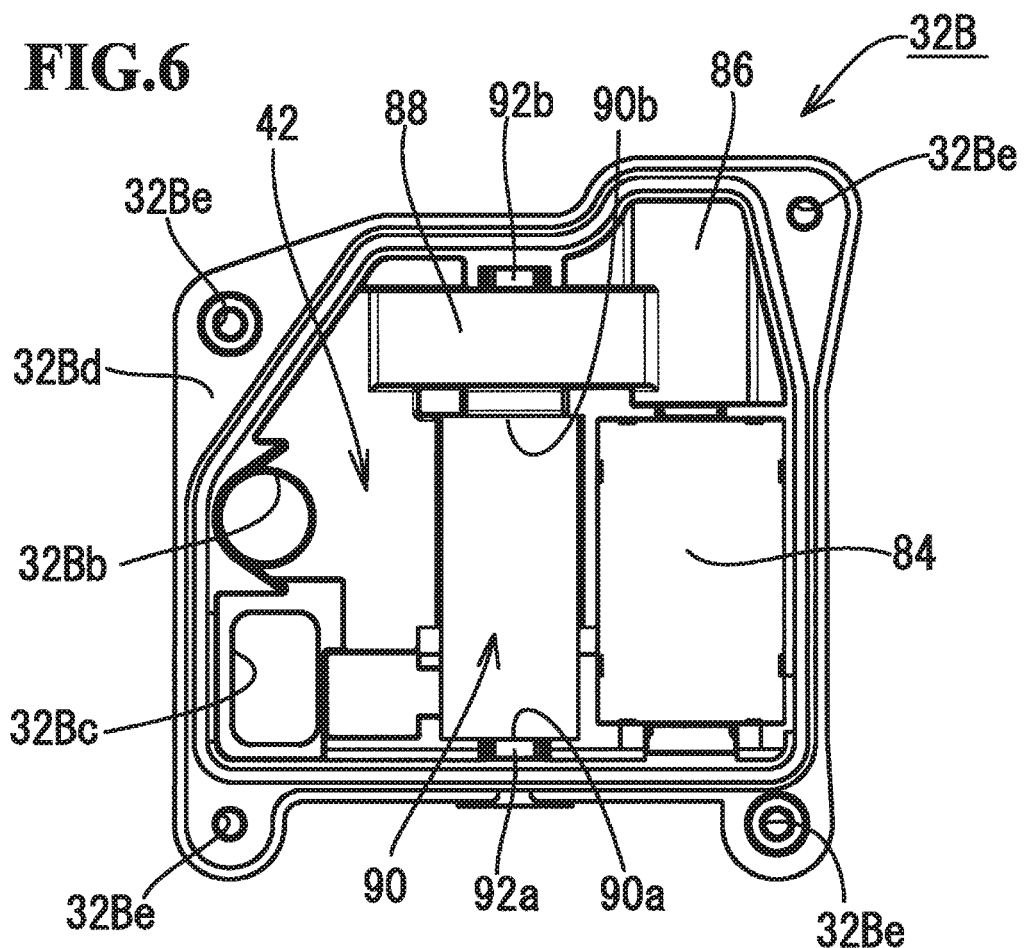
FIG. 6 is a plan view of the lower housing illustrated in FIG. 5 alone and illustrates an inner surface of the lower housing.

In FIG. 5, the operation knob 40 and the rotary shaft 50 are assembled by the screw 52 to form the manual operation element 38. Each of the operation knob 40 and the rotary shaft 50 is formed of a single-piece molding made of a reinforced resin material such as a glass-fiber reinforced resin. The manual operation element 38 is operated to be reversibly displaced in the locking direction and the unlocking direction (see FIG. 3B) via manual operation. The manual operation element 38 (including the manual operation element-side engagement portion 70) and the locking displaceable element-side engagement portion 72 of the slider 48 form the manual driving mechanism 68. The manual driving mechanism 68 is intended to reversibly displace the locking displaceable element 54 to the locked position and the unlocked position via manual operation. A round hole 74 is formed in a front surface of the lower housing 32B so as to extend to the inner space 42. A seal packing 76 (O-ring) made of rubber is received and disposed on the round hole 74. A seal packing retainer 78 is fitted and fixed to the front surface of the lower housing 32B coaxially with the round hole 74. Consequently, the seal packing 76 is held in the round hole 74. The locking pin projection hole 33 is formed so as to extend through a center of a surface of the seal packing retainer 78. The locking pin 36 is water-tightly inserted to the inner space 42 through the locking pin projection hole 33, a center hole of the seal packing 76 and the round hole 74 of the housing 32 (see FIG. 16B). A circuit that supplies driving power from the outside of the actuator device 28 to the motor 44 is disposed on the printed board 57. In other words, motor connection terminals 80a, 80b are provided at one end in a longitudinal direction of the printed board 57 and connector connection terminals (not illustrated) are provided at the other end, and wirings connecting both terminals are provided along the longitudinal direction. A seal packing 82 is attached to the other end so as to surround the connector connection terminals. The seal packing 82 is fitted and attached to a connector insertion port 32Bc formed in the lower housing 32B so as to water-tightly close the connector insertion port 32Bc (FIG. 6). The motor connection terminals 80a, 80b are inserted to the terminals 44a, 44b of the motor 44, respectively. A connector at ends of wirings connected to an in-vehicle port locking actuator driving circuit (not illustrated) is inserted and connected to the connector connection terminals.

Major components in FIG. 5 will be described in detail.
<<Lower Housing 32B (FIG. 6)>>

FIG. 6 illustrates an inner structure of the lower housing 32B. A motor receiving space 84, a gear receiving space 86, bearings 92a, 92b, a round gear receiving space 88, a slider receiving space 90, the recess 32Bb, the connector insertion port 32Bc, etc., are formed in the inner space 42 of the lower housing 32B. A lower portion of the motor 44 is received and held in the motor receiving space 84. In the gear receiving space 86, the gear 56 is received and disposed in so as to be not in contact with a peripheral wall surface of the gear receiving space 86. Lower surfaces of opposite ends in an axis direction of the composite gear 58 are bearing-supported on the bearings 92a, 92b. In the round gear receiving space 88, a lower portion of the round gear 64 is received and disposed so as to be not in contact with a peripheral wall surface of the round gear receiving space 88. In the slider receiving space 90, the lower portion of the slider 48 threadably connected to the feed screw 46 is slidably received and disposed along a longitudinal direction of the slider receiving space 90. Each of wall surfaces 90a (front end surface), 90b (rear end surface) of opposite ends in the longitudinal direction of the slider receiving space 90 form a locking displaceable element stopper. In other words, at the time of electrical operation of the locking displaceable element 54, the slider 48 comes into abutment with the locking displaceable element stoppers 90a, 90b and the locking displaceable element stoppers 90a, 90b mechanically lock the locking displaceable element 54 at the locked position or the unlocked position. Among the locking displaceable element stoppers 90a, 90b, the locking displaceable element stopper 90a stops displacement in the locking direction of the locking displaceable element 54 and the locking displaceable element stopper 90b stops displacement in the unlocking direction of the locking displaceable element 54. The recess 32Bb receives and rotatably supports the lower end 50a of the rotary shaft 50. The seal packing 82 of the printed board 57 is fitted and attached to the connector insertion port 32Bc. A butting surface 326d butting the upper housing 32A is formed at an entire peripheral edge of the lower housing 32B. A screw hole 32Be is formed at each of four corners in the entire butting surface 32Bd. The screws 41 for joining the upper housing 32A and the lower housing 32B are screwed into the respective screw holes 32Be.
<<Upper housing 32A (FIGS. 7A and 7B)>>

Figure 7A:
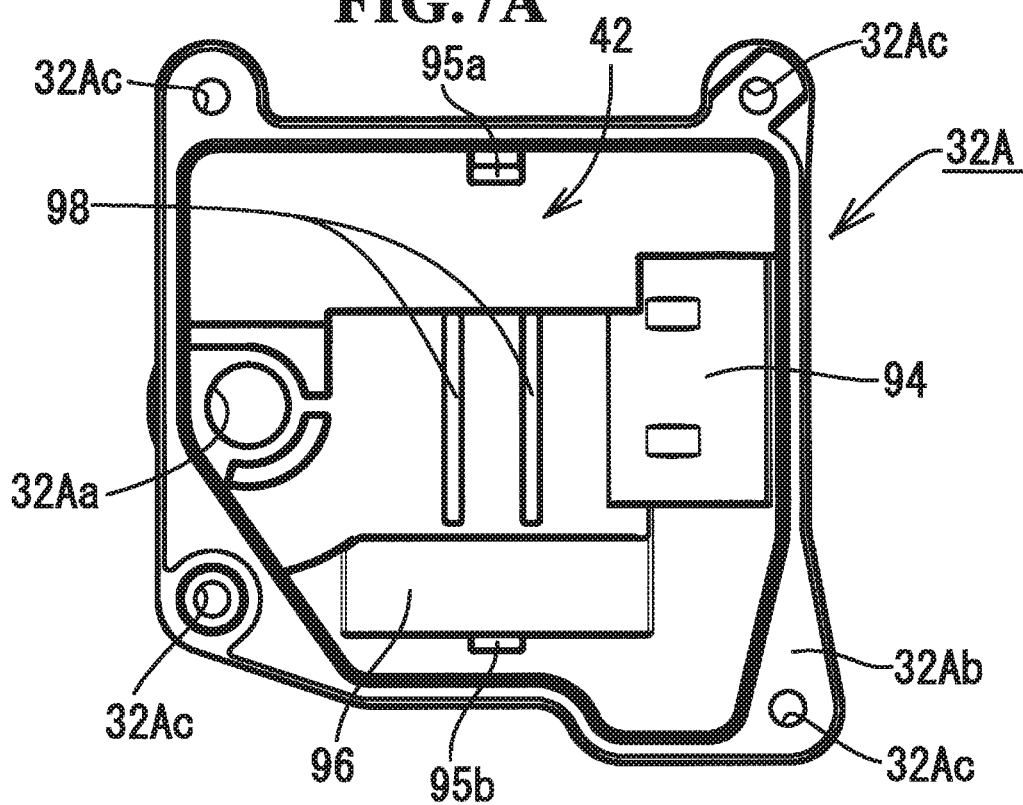
FIG. 7A is a bottom view of the upper housing illustrated in FIG. 5 alone and illustrates an inner surface of the upper housing.
Figure 7B:
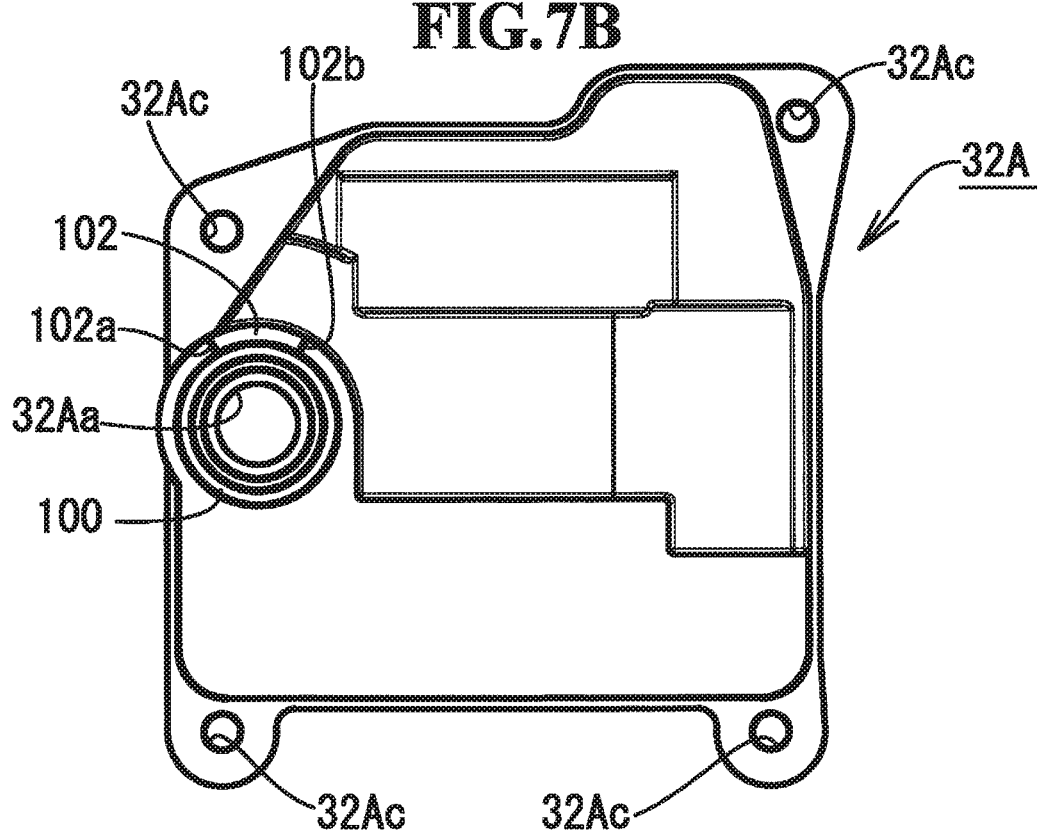
FIG. 7B is a plan view of the upper housing alone and illustrates an outer surface of the upper housing alone.

FIG. 7A illustrates an inner structure of the upper housing 32A. A motor receiving space 94, bearings 95a, 95b, a round gear receiving space 96, two rails 98, a through-hole 32Aa, etc., are formed in the inner space 42 of the upper housing 32A. An upper portion of the motor 44 is received and held in the motor receiving space 94. Upper surfaces of opposite ends in the axis direction of the composite gear 58 are bearing-supported on the bearings 95a, 95b. In the round gear receiving space 96, an upper portion of the round gear 64 is received and disposed so as to be not in contact with a peripheral wall surface of the round gear receiving space 96. The two rails 98 are lightly in abutment with the upper surface of the slider 48 and slidably support the slider 48 (see FIG. 4). The upper portion of the rotary shaft 50 is rotatably inserted through the through-hole 32Aa. A butting surface 32Ab butting the lower housing 32B is formed at an entire peripheral edge of the upper housing 32A. A screw though-hole 32Ac is formed at each of four corners in the entire butting surface 32Ab. The screws 41 for joining the upper housing 32A and the lower housing 32B are screwed into the respective screw though-holes 32Ac. FIG. 7B illustrates an outer structure of the upper housing 32A. An annular wall 100 is formed so as to project upward at a periphery of the through-hole 32Aa in an upper surface of the upper housing 32A. The annular wall 100 is formed coaxially with the through-hole 32Aa so as to surround the through-hole 32Aa (see FIG. 4). The annular wall 100 is rotatably received in an annular groove 101 (FIG. 8B) in a lower surface of the operation knob 40 (see FIG. 4). At an outer periphery of the annular wall 100, a manual operation element stopper forming projection 102 is formed integrally with the annular wall 100 so as to have a predetermined length in a circumferential direction. The manual operation element stopper forming projection 102 is fitted in a manual operation element-side recess 105 (FIG. 8B) of the operation knob 40, which will be described next, so as to be rotatable relative to the manual operation element-side recess 105 in a predetermined angle range in the direction around the rotation axis 38a. Consequently, the manual operation element stopper forming projection 102 restricts a rotational angle range of the manual operation element 38. Opposite ends in the circumferential direction of the manual operation element stopper forming projection 102 form manual operation element stoppers 102a, 102b. Among the manual operation element stoppers 102a, 102b, the manual operation element stopper 102a forms a stopper for the locking direction and the manual operation element stopper 102b forms a stopper for the unlocking direction.

<<Operation Knob 40 (FIGS. 8A and 8B)>>

Figure 8A:
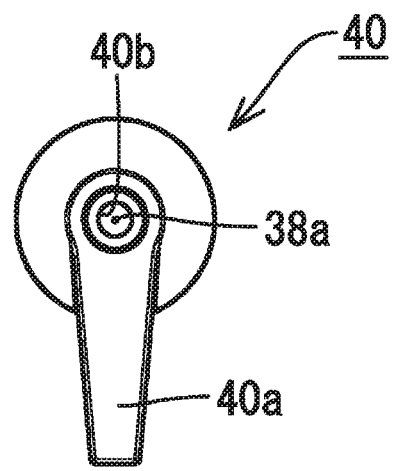
FIG. 8A is a plan view of the operation knob illustrated in FIG. 5 alone.
Figure 8B:
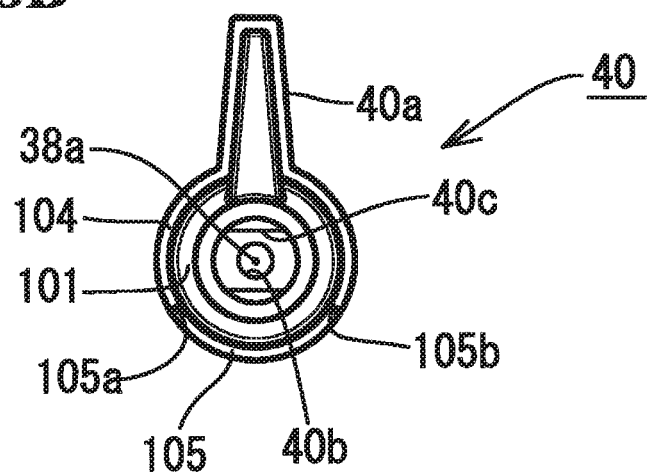
FIG. 8B is a bottom view of the operation knob alone.
Figure 9A:
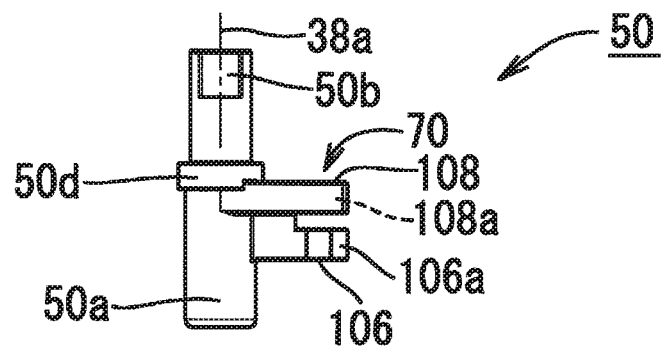
FIG. 9A is a front view of the rotary shaft illustrated in FIG. 5 alone.
Figure 9B:
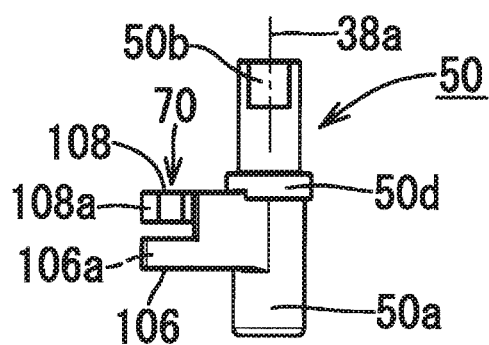
FIG. 9B is a back view of the rotary shaft alone.
Figure 9C:
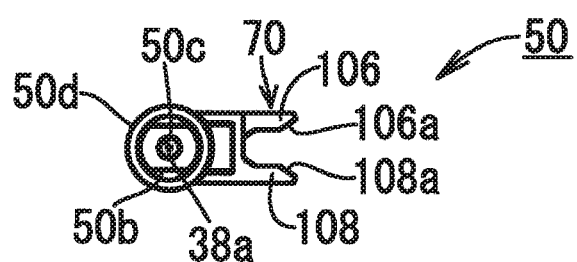
FIG. 9C is a plan view of the rotary shaft alone.
Figure 9D:
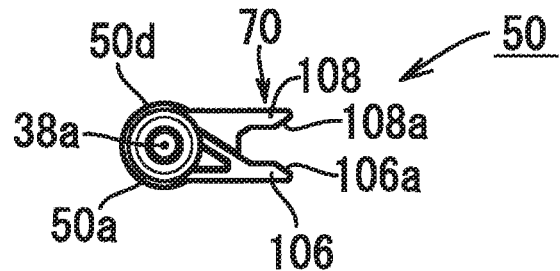
FIG. 9D is a bottom view of the rotary shaft alone.
Figure 9E:
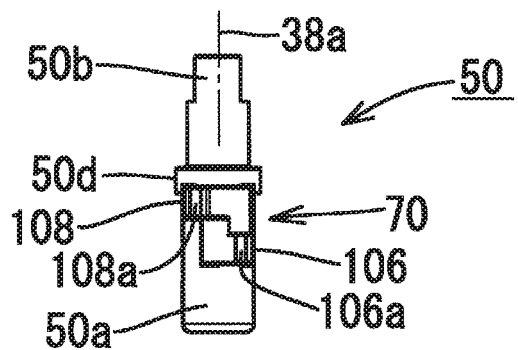
FIG. 9E is a right side view of the rotary shaft alone.
Figure 10A:
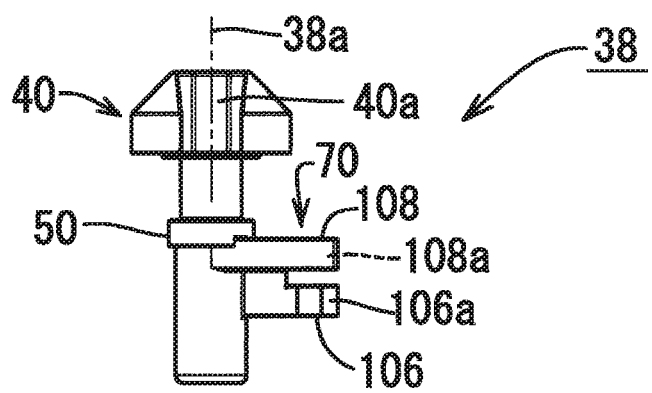
FIG. 10A is a front view of a manual operation element formed by assembling the operation knob and the rotary shaft each illustrated in FIG. 5.
Figure 10B:
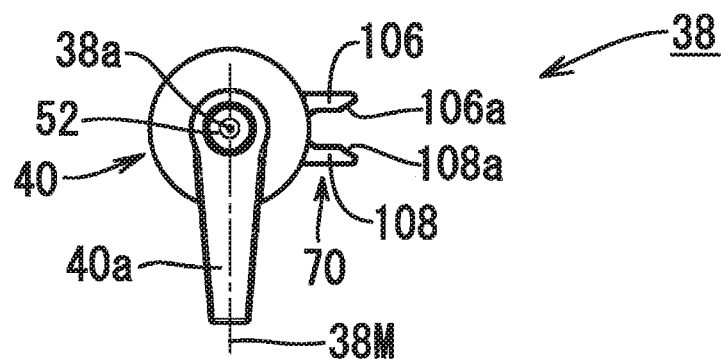
FIG. 10B is a plan view of the manual operation element.
Figure 10C:
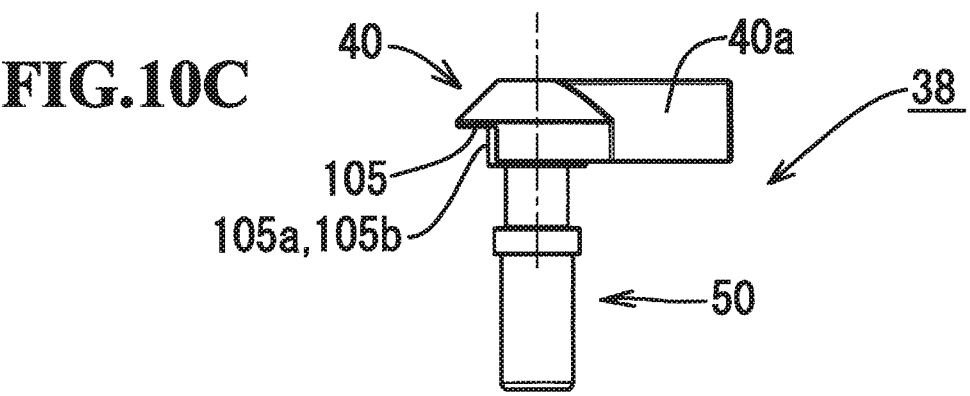
FIG. 10C is a left side view of the manual operation element.
Figure 10D:
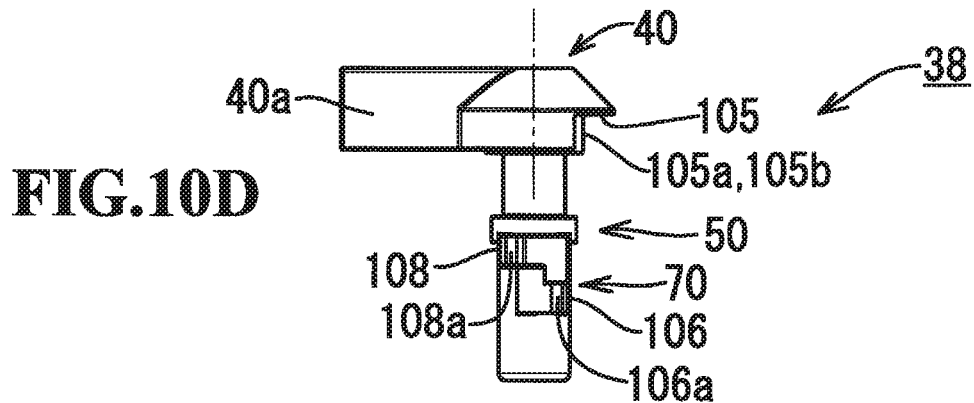
FIG. 10D is a right side view of the manual operation element.

FIG. 8A illustrates a structure of the operation knob 40 of the manual operation element 38 in plan view. In the operation knob 40, a handle 40a is provided so as to extend in a radial direction from a center of a planar surface of the operation knob 40. A screw insertion hole 40b for inserting the screw 52 is formed at the center of the planar surface of the operation knob 40. FIG. 8B illustrates a lower surface structure of the operation knob 40. The annular groove 101 that rotatably receives the annular wall 100 (FIG. 7B) at the upper surface of the upper housing 32A is formed in the lower surface of the operation knob 40. An area in a circumferential direction of a wall surface 104 on the outer circumferential side forming the annular groove 101 (that is, located at an outer circumference of the annular groove 101) is cut out and thereby forms a manual operation element-side recess 105. Opposite ends 105a, 105b in a circumferential direction (direction around the rotation axis 38a) of the manual operation element-side recess 105 are disposed at respective positions that are the same in the radial direction as the positions of the manual operation element stoppers 102a, 102b (FIG. 7B) of the upper housing 32A with reference to the rotation axis 38a (that is, with the rotation axis 38a as a center). The opposite ends 105a, 105b form manual operation element stopper abutment surfaces that come into abutment with the manual operation element stoppers 102a, 102b according to a direction of rotation of the manual operation element 38. Among the manual operation element stopper abutment surfaces, the manual operation element stopper abutment surface 105a forms an abutment surface for the locking direction. Also, the manual operation element stopper abutment surface 105b forms an abutment surface for the unlocking direction. In the direction around the rotation axis 38a, a length in the circumferential direction of the manual operation element stopper forming projection 102 (FIG. 7B) is set to be shorter than a length in the circumferential direction of the manual operation element-side recess 105. Consequently, the manual operation element stopper forming projection 102 and the manual operation element-side recess 105 are disposed in such a manner that the manual operation element stopper forming projection 102 and the manual operation element-side recess 105 are fitted to each other so as to be rotatable relative to each other in a predetermined angle range in the direction around the rotation axis 38a (see FIG. 14). The positions in the radial direction of the manual operation element stopper abutment surfaces 105a, 105b with reference to the rotation axis 38a are disposed at positions on the outer circumferential side relative to a diameter of the rotary shaft 50. Consequently, a force generated when rotation of the operation knob 40 is stopped by the manual operation element stoppers 102a, 102b is received by the operation knob 40 at a position that is relatively far from the rotation axis 38a, which is a center of the rotation. Therefore, when the operation knob 40 is forcedly operated, the operation knob 40 can be prevented from being broken by an excessive force being applied to the operation knob 40. Also, a force generated when rotation of the operation knob 40 is stopped by the manual operation element stoppers 102a, 102b is received by the operation knob 40 and not imposed on the rotary shaft 50. Therefore, when the operation knob 40 is forcedly operated, the rotary shaft 50 can be prevented from being broken by large distortion occurring in the rotary shaft 50. A rotary shaft insertion hole 40c that allows the upper end of the rotary shaft 50 to be unrotatably inserted thereto is formed at a center of the lower surface of the operation knob 40.

<<Rotary Shaft 50 (FIGS. 9A to 9E)>>

FIGS. 9A to 9E illustrate a structure of the rotary shaft 50 of the manual operation element 38 as viewed from various directions. The lower end 50a of the rotary shaft 50 is rotatably received and supported in the recess 32Bb (FIG. 6) of the lower housing 32B. The upper end 50b of the rotary shaft 50 is unrotatably inserted to the rotary shaft insertion hole 40c (FIG. 8B) in the lower surface of the operation knob 40. A screw hole 50c (FIG. 9C) that allows the screw 52 (FIG. 5) for fixation of the operation knob 40 to be screwed thereinto is formed at a center of a top surface of the rotary shaft 50. A bulge 50d that bulges outward is formed at a center in an axis direction of the rotary shaft 50. When the rotary shaft 50 is received in the inner space 42 of the housing 32, the bulge 50d is loosely held between the upper housing 32A and the lower housing 32B (see FIG. 4). Consequently, displacement in the axis direction (top-bottom direction) of the rotary shaft 50 relative to the housing 32 is suppressed. The manual operation element-side engagement portion 70 is formed at a side surface, between the bulge 50d and the lower end 50a, of the rotary shaft 50 so as to laterally project. As described above, the manual operation element-side engagement portion 70 is intended to engage with the locking displaceable element-side engagement portion 72 (FIG. 5) formed at the slider 48 and transfer the locking displaceable element 54 in the locking direction or the unlocking direction according to a manual operation of the manual operation element 38. A configuration of the manual operation element-side engagement portion 70 will be described. The manual operation element-side engagement portion 70 includes two projections, a locking active surface forming projection 106 and an unlocking active surface forming projection 108. The locking active surface forming projection 106 and the unlocking active surface forming projection 108 are disposed in a projecting manner with respective positions shifted to each other in two directions orthogonal to each other, the direction around the rotation axis 38a and a direction along the rotation axis 38a. Opposed surfaces 106a, 108a of distal ends of the locking active surface forming projection 106 and the unlocking active surface forming projection 108 are disposed so as to face each other in the direction along the direction around the rotation axis 38a and be shifted from each other in the direction along the rotation axis 38a. Also, the opposed surfaces 106a, 108a are inclined surfaces each inclined so as to face outward. The surface 106a forms a locking active surface that transfers the locking displaceable element 54 in the locking direction and the surface 108a forms an unlocking active surface that transfers the locking displaceable element 54 in the unlocking direction.

<<Manual Operation Element 38 (FIGS. 10A to 10D)>>

FIGS. 10A to 10D illustrate a structure of the manual operation element 38 formed by assembling the rotary shaft 50 and the operation knob 40 via the screw 52, as viewed in various directions. FIGS. 10A to 10D illustrate the manual operation element 38 in a position in which the manual operation element 38 is located at an intermediate position 38M (neutral position) in the rotational range thereof. At this time, the handle 40*a* of the operation knob 40 projects to the front side (that is, forward), the manual operation element-side engagement portion 70 (the locking active surface forming projection 106 and the unlocking active surface forming projection 108) projects rightward and the manual operation element-side recess 105 is disposed on the back side of the operation knob 40.

<<Slider 48 (FIGS. 11A to 11F)>>

FIGS. 11A to 11F illustrate a structure of the slider 48 as viewed in various directions. The slider 48 is formed in a substantially rectangular parallelepiped shape as a whole. At a left side surface 48*e* of the slider 48, the locking displaceable element-side engagement portion 72 is formed so as to project laterally. As described above, the manual operation element-side engagement portion 70 is engaged with the locking displaceable element-side engagement portion 72 and an operation of the manual operation element 38 is transmitted to the locking displaceable element-side engagement portion 72. A configuration of the locking displaceable element-side engagement portion 72 will be described. The locking displaceable element-side engagement portion 72 includes two projections, a locking passive surface forming projection 111 and an unlocking passive surface forming projection 113. The locking passive surface forming projection 111 and the unlocking passive surface forming projection 113 are disposed in a projecting manner with respective positions shifted each other in two directions, a displacement direction of the slider 48 and a top-bottom direction orthogonal to the displacement direction. Opposed surfaces 111*a*, 113*a* of the locking passive surface forming projection 111 and the unlocking passive surface forming projection 113 are disposed so as to face each other in the displacement direction of the slider 48 and be shifted from each other in the top-bottom direction. The surface 111*a* forms a locking passive surface that allows the locking active surface 106*a* to abut thereon and is thereby pressed in the locking direction. The surface 113*a* forms an unlocking passive surface that allows the unlocking active surface 108*a* to abut thereon and is thereby pressed in the unlocking direction. In addition, the female thread 115 to which the feed screw 46 threadably connected is formed in the slider 48 so as to extend through between the front end surface 48*a* and the rear end surface 48*b*. The front end surface 48*a* forms a locking displaceable element stopper abutment surface that comes into abutment with the locking displaceable element stopper 90*a* (FIG. 6) (abutment surface for the locking direction). The rear end surface 48*b* forms a locking displaceable element stopper abutment surface that comes into abutment with the locking displaceable element stopper 90*b* (FIG. 6) (abutment surface for the unlocking direction). Furthermore, in the slider 48, two locking pin insertion holes 66, 67 are formed at respective positions immediately below the female thread 115 in such a manner that the locking pin insertion holes 66, 67 are aligned on a straight line parallel to an axis of the female thread 115 (see FIG. 16B). A pair of claws 117, 117 facing each other are formed at respective positions between the two locking pin insertion holes 66, 67.

A space 118 is formed between the claws 117, 117. Also, on the opposite, right and left, side of the lower surface 48*d* of the slider 48, rails 119 are formed over an entire length of the slider 48 along the displacement direction in which the slider 48 is displaced, respectively. The slider 48 slides in the slider receiving space 90 of the lower housing 32B with the rails 119 abutting on a bottom surface of the slider receiving space 90.

<<Locking Displaceable Element 54 (FIGS. 12A to 12E)>>

Figure 11A:
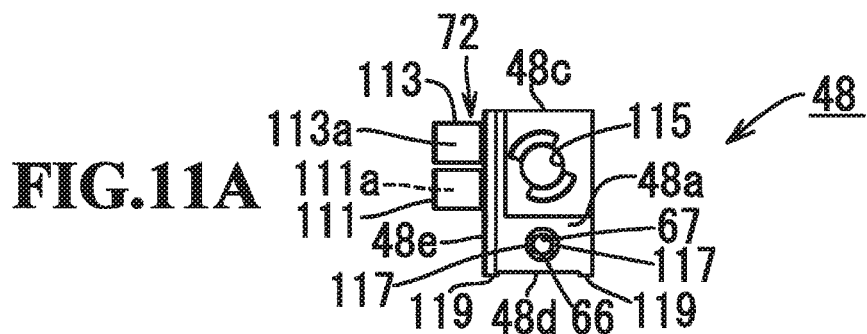
FIG. 11A is a front view of the slider illustrated in FIG. 5 alone.
Figure 11B:
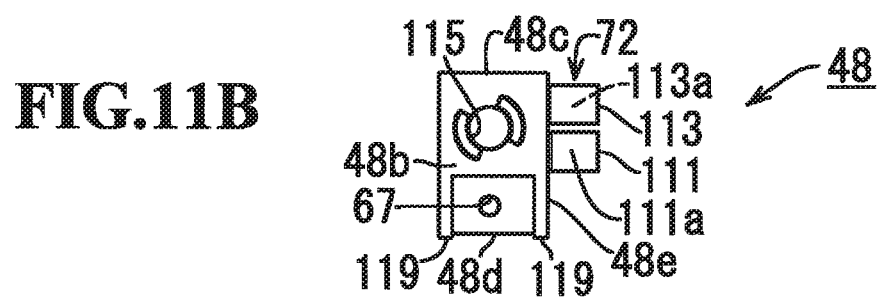
FIG. 11B is a back view of the slider alone.
Figure 11C:
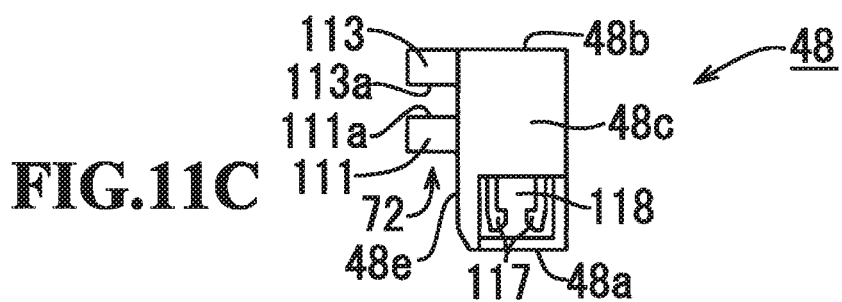
FIG. 11C is a plan view of the slider alone.
Figure 12B:
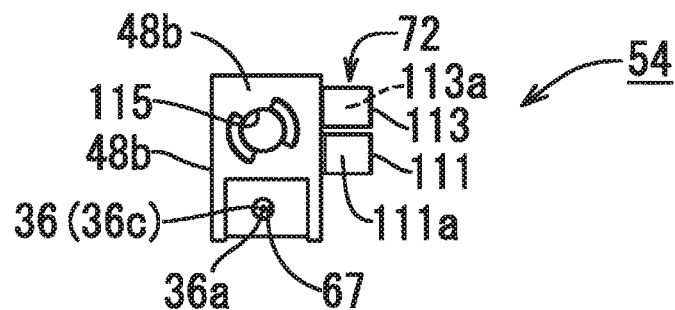
FIG. 12B is a back view of the locking displaceable element.
Figure 12C:
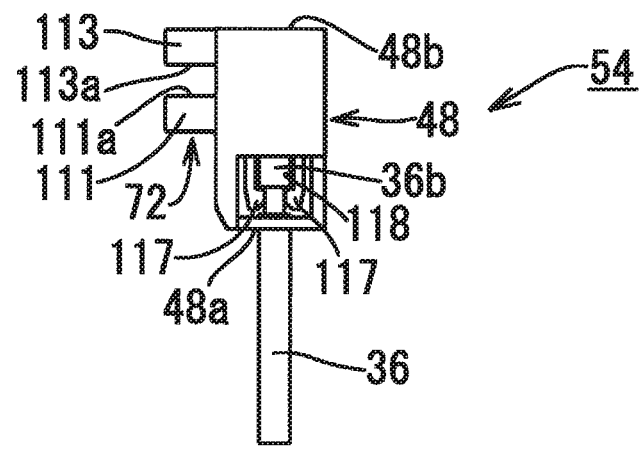
FIG. 12C is a plan view of the locking displaceable element.
Figure 12D:
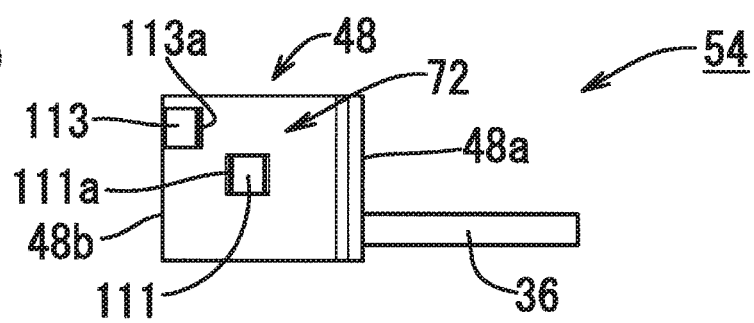
FIG. 12D is a left side view of the locking displaceable element.
Figure 12E:
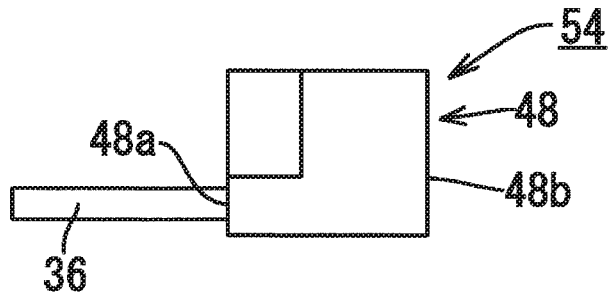
FIG. 12E is a right side view of the locking displaceable element.

FIGS. 12A to 12E illustrate a structure of the locking displaceable element 54 formed by assembling the slider 48 and the locking pin 36, as viewed in various directions. The locking pin 36 is inserted to the locking pin insertion hole 66 (FIG. 12A) of the slider 48 from the rear end side of the locking pin 36 and is made to penetrate the space 118 between the claws 117, 117 (FIGS. 12C and 11C). Then, a thin portion 36*c* (FIGS. 5 and 16B) at a rear end of the locking pin 36 is pressed into the locking pin insertion hole 67 (FIGS. 12B and 16B) on the back side. Consequently, the locking pin 36 is assembled to the slider 48. At an intermediate position in the axis direction of the locking pin 36, a bulge 36*b* (FIGS. 12C, 5 and 16B) that bulges outward is formed. In a state in which the locking pin 36 is assembled to the slider 48, the claws 117, 117 engage with a stepped portion at a front end of the bulge 36*b* (FIG. 12C). Consequently, the locking pin 36 is prevented from coming off from the slider 48 or rattling in the slider 48, and the assembled state is stably maintained.

The actuator device 28 in FIG. 5 can be assembled, for example, according to the following procedure.

(1) Attach the gear 56 to the motor shaft 45.

(2) Threadably connect the slider 48 to the feed screw 46.

(3) Put and dispose the motor 44 with the gear 56 attached thereto, the assembled component of the composite gear 58 and the slider 48 and the rotary shaft 50 at respective predetermined positions in the lower housing 32B.

(4) Insert the motor connection terminals 80*a*, 80*b* at the one end of the printed board 57 to the terminals 44*a*, 44*b* of the motor 44. Fit and attach the seal packing 82 at the other end of the printed board 57 to the connector insertion port 32Be (FIG. 6) of the lower housing 32B. Consequently, the printed board 57 is assembled to the lower housing 32B side.

(5) Fit the seal packing 76 in the round hole 74 in the front surface of the lower housing 32B and attach the seal packing retainer 78.

(6) Insert the locking pin 36 to the locking pin projection hole 33 from the rear end of the locking pin 36 and press the locking pin 36 in until the locking pin 36 butts.

(7) Apply an adhesive to the butting surface 32Bd at the entire peripheral edge of the lower housing 32B.

(8) Put the upper housing 32A on the lower housing 32B. At this time, the upper portion of the rotary shaft 50 projects to the outside space from the through-hole 32Aa of the upper housing 32A.

(9) Insert the screws 41 to the screw though-holes 32Ac at the four corners of the upper housing 32A, respectively, and screw the screws 41 into the screw holes 32Be of the lower housing 32B and fasten the screws 41 to the screw holes 32Be. Consequently, the upper housing 32A and the lower housing 32B are joined.

(10) Fit the seal packing 55 on the upper portion of the rotary shaft 50 projecting to the outside space, put the operation knob 40 on the upper end of the rotary shaft 50, and fasten the rotary shaft 50 and the operation knob 40 via the screw 52 to join the rotary shaft 50 and the operation knob 40. As above, the actuator device 28 is assembled in the state illustrated in FIGS. 2 and 3.

The rotation range of the manual operation element 38 will be described. FIG. 13 illustrates the actuator device 28 with the operation knob 40 and the upper housing 32A removed. At this time, restriction of the rotational angle range of the manual operation element 38 by abutment between the manual operation element stoppers 102a, 102b (FIG. 7B) of the upper housing 32A and the manual operation element stopper abutment surfaces 105a, 105b (FIG. 8B) of the operation knob 40 is not effected. Therefore, in FIG. 13, upon the rotary shaft 50 being turned counterclockwise to transfer the locking displaceable element 54 in the unlocking direction (mechanism for the transfer will be described later), the locking displaceable element stopper abutment surface 48b formed by the rear end surface of the slider 48 comes into abutment with the locking displaceable element stopper 90b formed by the rear end surface of the slider receiving space 90 and the transfer of the locking displaceable element 54 is thereby stopped. FIG. 13 illustrates a state in this case. In this case, a rotational angle of the rotary shaft 50 relative to an intermediate position 38M in the rotation range of the manual operation element 38 is 33 degrees. Upon the rotary shaft 50 being forcedly operated further counterclockwise from this state, an excessive force is applied to the part of engagement between the rotary shaft 50 and the slider 48 (the manual operation element-side engagement portion 70 and the locking displaceable element-side engagement portion 72), which may cause breakage of the engagement part. Then, upon the rotary shaft 50 being turned clockwise to transfer the locking displaceable element 54 in the locking direction (mechanism for the transfer will be described later), the locking displaceable element stopper abutment surface 48a formed by the front end surface of the slider 48 comes into abutment with the locking displaceable element stopper 90a formed by the front end surface of the slider receiving space 90 and the transfer of the locking displaceable element 54 is thereby stopped. In this case, a rotational angle of the rotary shaft 50 relative to the intermediate position 38M in the rotation range of the manual operation element 38 is also 33 degrees. Upon the rotary shaft 50 being forcedly operated further clockwise from this state, an excessive force is applied to the part of engagement between the rotary shaft 50 and the slider 48 (the manual operation element-side engagement portion 70 and the locking displaceable element-side engagement portion 72), which may cause breakage of the engagement part.

On the other hand, FIG. 14 illustrates a positional relationship between the manual operation element stoppers 102a, 102b of the upper housing 32A and the manual operation element stopper abutment surfaces 105a, 105b of the operation knob 40 in the actuator device 28 with the operation knob 40 and the upper housing 32A attached thereto. Note that FIG. 14 illustrates a sectional surface at the arrow B-B position in FIG. 3A and illustrates a state in which the operation knob 40 is located at the intermediate position 38M in the rotation range. The operation knob 40 can be rotated in the locking direction until the manual operation element stopper abutment surface 105a abuts against and is thereby stopped by the manual operation element stopper 102a. Also, the operation knob 40 can be rotated in the unlocking direction until the manual operation element stopper abutment surface 105b abuts against and is thereby stopped by the manual operation element stopper 102b. These angles of rotation until the abutment and stoppage are 29 degrees relative to the intermediate position 38M both in the locking direction and the unlocking direction. The rotational angle of 29 degrees in the locking direction is an angle at which the locking displaceable element 54 sufficiently reaches the locked position and a locked state by the locking pin 36 is obtained. Also, the rotational angle of 29 degrees in the unlocking direction is an angle at which the locking displaceable element 54 sufficiently reaches the unlocked position and an unlocked state by the locking pin 36 is obtained. Accordingly, when the manual operation element 38 is operated, after the locking displaceable element 54 reaching the locked position or the unlocked position, the manual operation element 38 abuts against and is thereby stopped by the manual operation element stoppers 102a, 102b before abutting against and being thereby stopped by the locking displaceable element stoppers 90a, 90b (FIG. 13). Therefore, even if the manual operation element 38 is forcedly operated, no excessive force is applied to the part of engagement between the locking displaceable element 54 and the manual operation element 38 (the manual operation element-side engagement portion 70 and the locking displaceable element-side engagement portion 72), enabling prevention of breakage of the engagement part. FIGS. 15A and 15B illustrate a sectional surface at the arrow B'-B' position in FIG. 3A. Among the figures, FIG. 15A illustrates a state in which the manual operation element 38 has been operated in the locking direction and the manual operation element stopper abutment surface 105a has thereby abutted against and been stopped by the manual operation element stopper 102a. Also, FIG. 15B illustrates a state in which the manual operation element 38 has been operated in the unlocking direction and the manual operation element stopper abutment surface 105b has thereby abutted against and been stopped by the manual operation element stopper 102b.

Figure 16A:
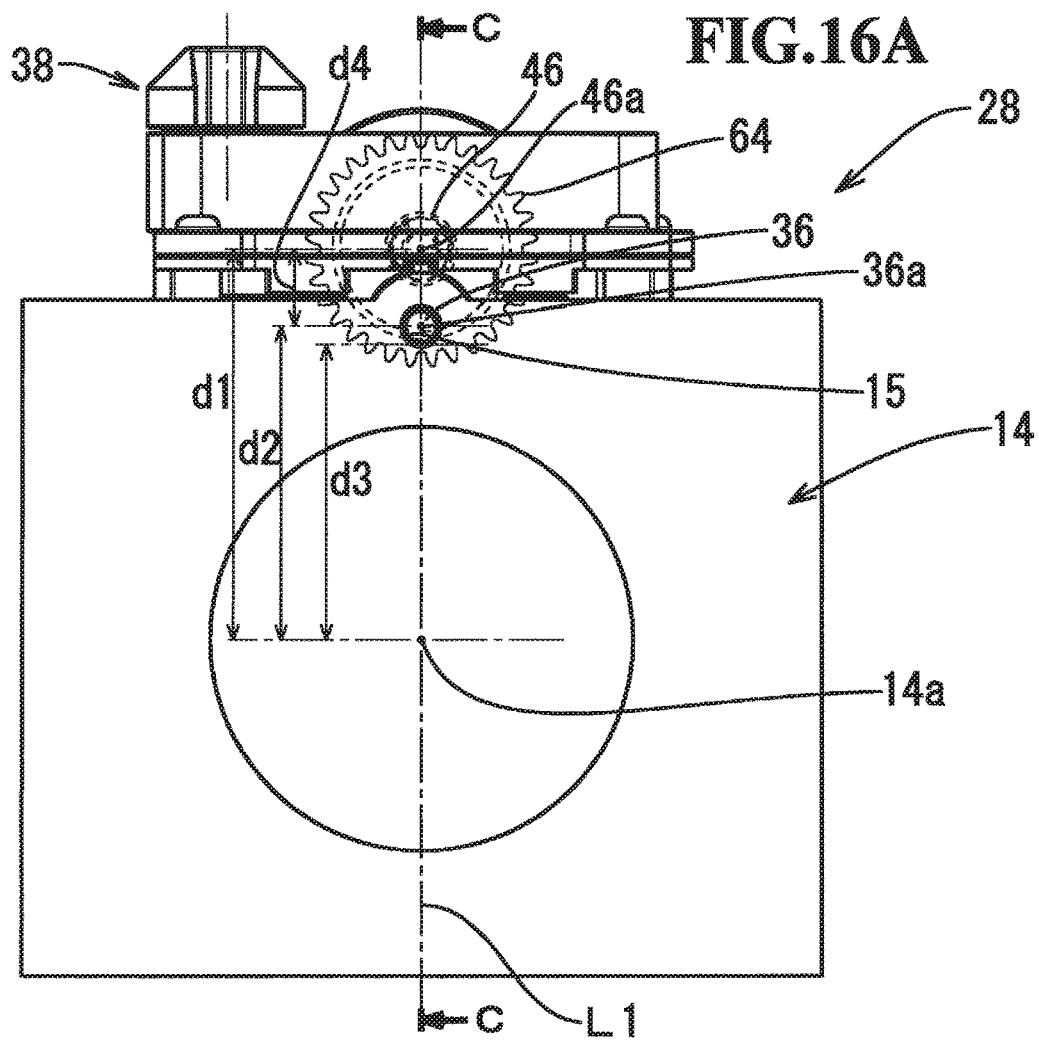
FIG. 16A is a diagram of the vehicle inlet in FIG. 1 as viewed in an insertion/removal direction of a charging connector, and illustrates a state in which positions of respective center axes of the vehicle inlet, the locking pin and a feed screw are arranged on a single straight line in a plane orthogonal to the three center axes.
Figure 16B:
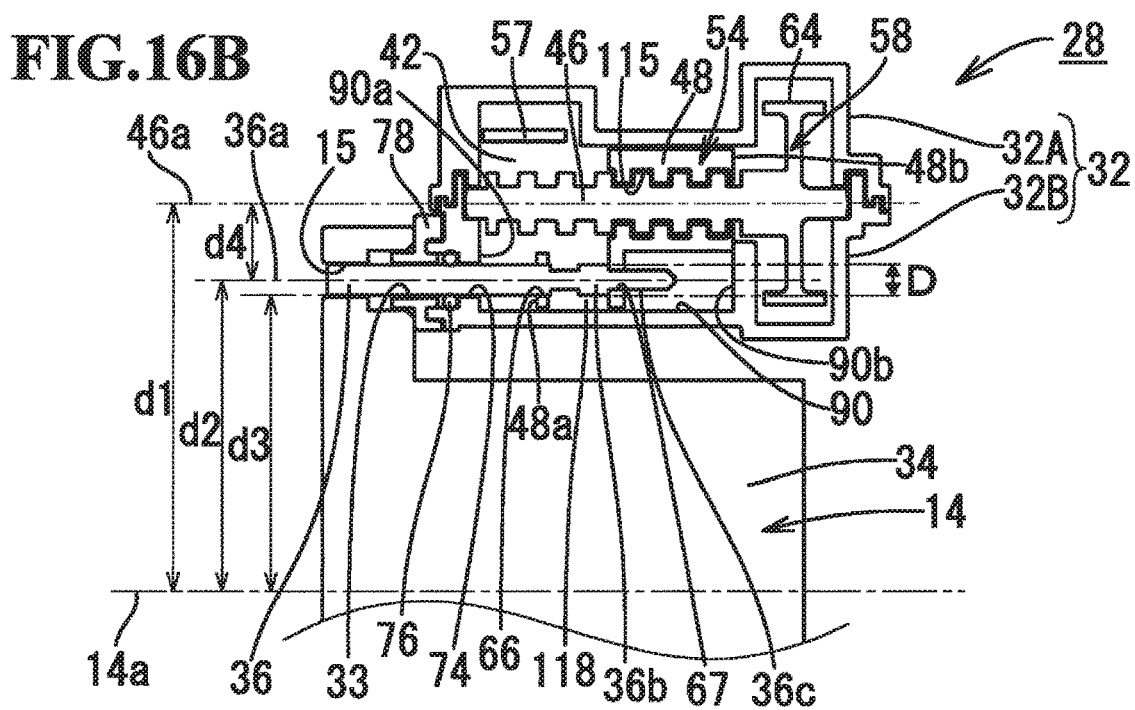
FIG. 16B is an arrow C-C sectional view of FIG. 16A (illustration of a lower part of the vehicle inlet is omitted).

A positional relationship, etc. will be described, the positional relation ship being those of among the respective axes in a state in which the actuator device 28 mounted in the vehicle inlet 14. FIG. 16A illustrates the vehicle inlet 14 in FIG. 1 as viewed in the insertion/removal direction of the charging connector 18. FIG. 16B illustrates a sectional surface at the C-C arrow position in FIG. 16A. The center axis 36a of the locking pin 36 and the center axis 46a of the feed screw 46 are each disposed in parallel with the center axis 14a of the vehicle inlet 14. Also, a positional relationship between the feed screw 46 and the locking pin 36 is set in such a manner that an interaxial distance d1 between the center axis 14a of the vehicle inlet 14 and the center axis 46a of the feed screw 46 is larger than an interaxial distance d2 between the center axis 14a of the vehicle inlet 14 and the center axis 36a of the locking pin 36. Although a distance d3 between the center axis 14a of the vehicle inlet 14 and a lower surface of the locking pin 36 is set according to the relevant standard, since the setting is made so that d1>d2, the center axis 46a of the feed screw 46 (=a center axis of the round gear 64) can be disposed away from the outer sleeve 34 of the vehicle inlet 14. Therefore, the round gear 64 can be formed so as to have a large diameter without interfering with the outer sleeve 34 of the vehicle inlet 14 (see FIG. 16B), enabling setting a large reduction ratio between the round gear 64 and the gear 56 (FIG. 5) meshing with the round gear 64. Consequently, the preceding gear disposed between the round gear 64 and the motor 44 can be formed by the single gear 56 alone, enabling simple configuration of the electrical driving mechanism 60.

In FIG. 16A, the center axis 14a of the vehicle inlet 14, the center axis 36a of the locking pin 36 and the center axis 46a of the feed screw 46 are parallel to one another. Also, in a plane orthogonal to these three center axes 14a, 36a, 46a (the surface of the sheet of FIG. 16A), these three center axes 14a, 36a, 46a are aligned on a vertical straight line L1. Here, it is assumed that the center axis 46a of the feed screw 46 is disposed at a position off the straight line L1 with each of the interaxial distance d2 between the vehicle inlet 14 and the locking pin 36 and an interaxial distance d4 between the locking pin 36 and the feed screw 46 maintained at a fixed value. In this case, the interaxial distance d1 between the vehicle inlet 14 and the feed screw 46 is necessarily short in comparison with the case where the center axis 46a of the feed screw 46 is disposed at a position on the straight line L1 (disposition in FIG. 16A). As a result, the round gear 64 can easily come close to and interfere with the outer sleeve 34 of the vehicle inlet 14. In order to avoid the interference, it is necessary to make the round gear 64 have a small diameter. Accordingly, aligning the center axis 14a of the vehicle inlet 14, the center axis 36a of the locking pin 36 and the center axis 46a of the feed screw 46 on the single straight line L1 can be considered advantageous for making the round gear 64 have a large diameter.

In FIG. 16B, the locking pin 36 is mounted in the slider 48 so as to orient toward a direction that is opposite to a direction from the slider 48 toward the round gear 64. Therefore, the locking pin 36 can be disposed without interfering with the round gear 64. Also, the center axis 36a of the locking pin 36 is disposed at a position at which the center axis 36a falls within a plane of the round gear 64. Therefore, in comparison with a case where the center axis 36a of the locking pin 36 is disposed at a position at which the center axis 36a falls outside the plane of the round gear 64, an interaxial distance d4 between the locking pin 36 and the feed screw 46 is short. Consequently, a section, in a direction orthogonal to the center axis 46a of the feed screw 46, of the slider 48 can be reduced, enabling forming the slider 48 so as to have a smaller size. In particular, in this embodiment, the locking pin 36 is disposed at a position at which an entire diameter D of the locking pin 36 falls within the plane of the round gear 64, and thus, the section, in the direction orthogonal to the center axis 46a of the feed screw 46, of the slider 48 can be made to be further smaller. Therefore, the slider 48 can be formed so as to have a further smaller size.

A locking operation and an unlocking operation of the actuator device 28 by electrical operation and manual operation will be described, respectively.

<<Locking Operation by Electrical Operation (FIGS. 17A to 17C)>>

Figure 17A:
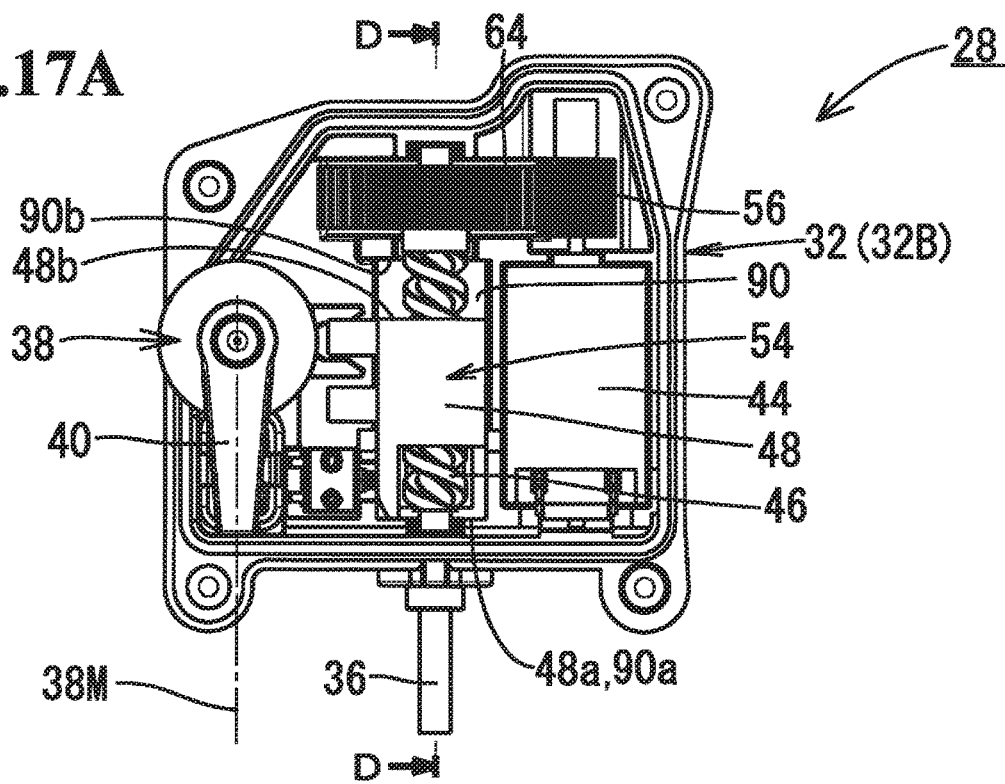
FIG. 17A is a plan view of the port locking actuator device in FIG. 2 with the upper housing removed and illustrates a state in which the locking displaceable element has been displaced to a locked position via electrical operation.
Figure 17B:
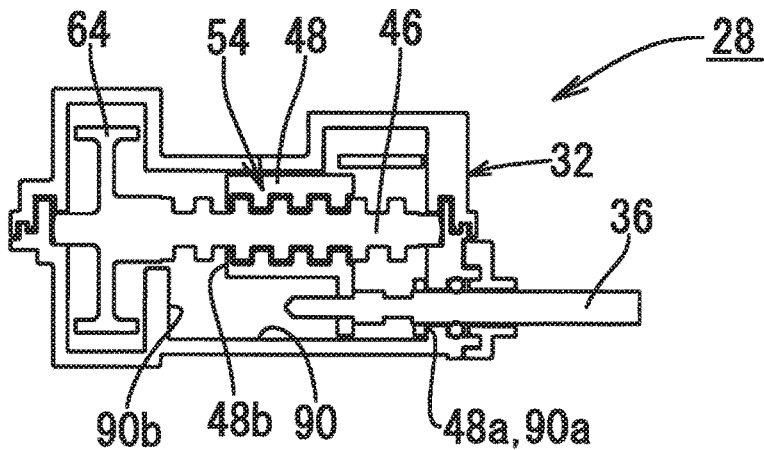
FIG. 17B is an arrow D-D sectional view of FIG. 17A.
Figure 17C:
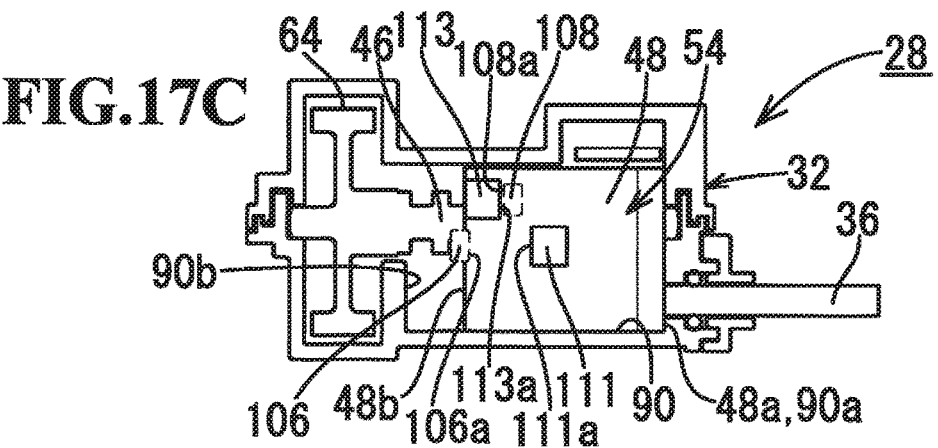
FIG. 17C is a diagram in which a locking active surface forming projection of the manual operation element, an unlocking active surface forming projection of the manual operation element, a locking passive surface forming projection of the slider and an unlocking passive surface forming projection of the slider are superimposed on FIG. 17B, and indicates a positional relationship among the locking active surface of the manual operation element, the unlocking active surface of the manual operation element, the locking passive surface of the slider and the unlocking passive surface of the slider.

FIGS. 17A to 17C illustrate a state in which the locking displaceable element 54 has been displaced to the locked position via electrical operation. The locking operation by electrical operation is performed by applying a direct-current voltage for the locking direction from the in-vehicle port locking actuator driving circuit (not illustrated) to the motor 44 for a predetermined set length of time (that is, a length of time sufficient for electrically displacing the locking displaceable element 54 from the unlocked position to the locked position). Upon the motor 44 being driven by the application of the direct-current voltage, the locking displaceable element 54 is transferred in the locking direction, and along with the transfer, the locking pin 36 projects from the housing 32. During the transfer of the locking displaceable element 54, the locking active surface 106a and the unlocking passive surface 113a pass each other and the unlocking active surface 108a and the locking passive surface 111a pass each other. Upon the locking displaceable element stopper abutment surface 48a (front end surface of the slider 48) abutting against the locking displaceable element stopper 90a (front end surface of the slider receiving space 90), the locking displaceable element 54 is mechanically stopped (state illustrated in FIGS. 17A to 17C). After the locking displaceable element 54 being mechanically stopped at the locked position, the power supply to the motor 44 is stopped because of elapse of the set length of time of the application and the locking displaceable element 54 is held at the stopped position. Where the manual operation element 38 is located at the intermediate position 38M illustrated in FIG. 17A at the start of the locking operation, during the electrical locking operation, neither the locking active surface 106a and the locking passive surface 111a nor the unlocking active surface 108a and the unlocking passive surface 113a engages (come into abutment) with each other. In other words, in FIG. 17C, the unlocking active surface 108a and the unlocking passive surface 113a are close to each other but not in abutment with each other. Therefore, during the electrical locking operation, the manual operation element 38 remains still at the intermediate position 38M and does not rotate.

<<Unlocking Operation by Electrical Operation (FIGS. 18A to 18C)>>

Figure 18A:
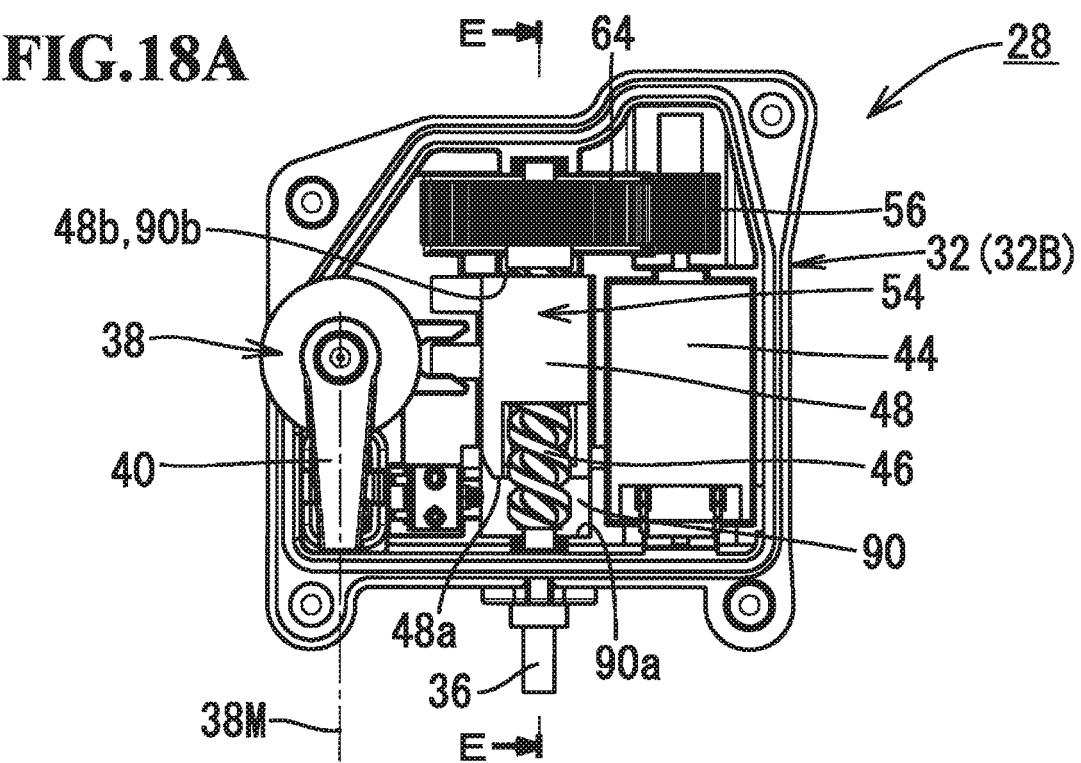
FIG. 18A is a plan view of the port locking actuator device in FIG. 2 with the upper housing removed and illustrates a state in which the locking displaceable element has been displaced to an unlocked position via electrical operation.
Figure 18B:
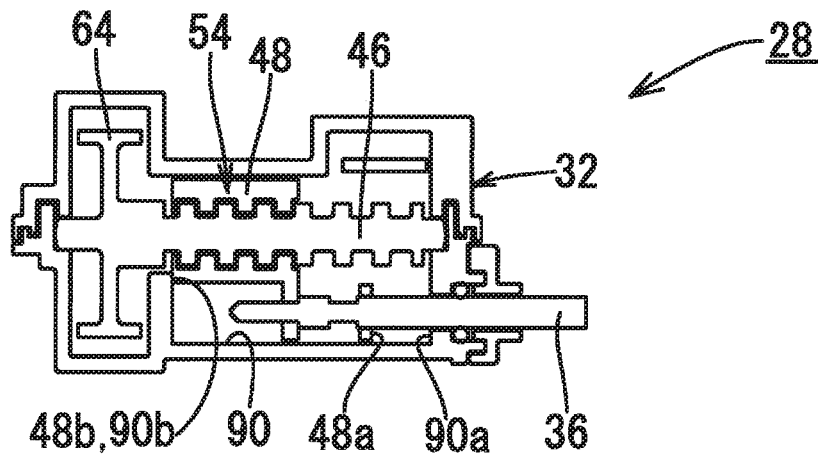
FIG. 18B is an arrow EE sectional view of FIG. 18A.
Figure 18C:
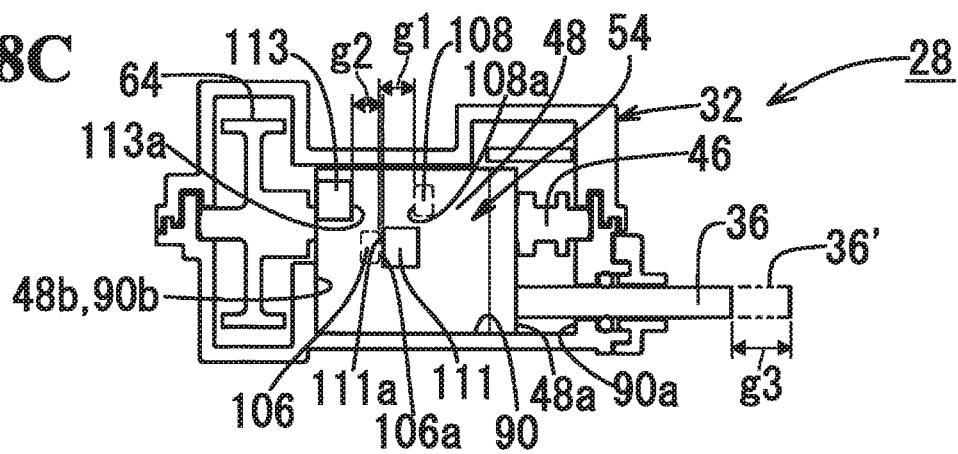
FIG. 18C is a diagram in which the locking active surface forming projection of the manual operation element, the unlocking active surface forming projection of the manual operation element, the locking passive surface forming projection of the slider and the unlocking passive surface forming projection of the slider are superimposed on FIG. 18B and indicates a positional relationship among the locking active surface of the manual operation element, the unlocking active surface of the manual operation element, the locking passive surface of the slider and the unlocking passive surface of the slider.

FIGS. 18A to 18C illustrate a state in which the locking displaceable element 54 has been displaced to the unlocked position via electrical operation. The unlocking operation by electrical operation is performed by applying a direct-current voltage for the unlocking direction from the in-vehicle port locking actuator driving circuit (not illustrated) to the motor 44 for a predetermined set length of time (that is, a length of time sufficient for electrically displacing the locking displaceable element 54 from the locked position to the unlocked position). Upon the motor 44 being driven by the application of the direct-current voltage, the locking displaceable element 54 is transferred to the unlocking direction, and along with the transfer, the locking pin 36 is retracted into the housing 32. During the transfer of the locking displaceable element 54, the locking active surface 106a and the unlocking passive surface 113a pass each other and the unlocking active surface 108a and the locking passive surface 111a pass each other. Upon the locking displaceable element stopper abutment surface 48b (rear end surface of the slider 48) abutting against the locking displaceable element stopper 90b (rear end surface of the slider receiving space 90), the locking displaceable element 54 is mechanically stopped (state illustrated in FIGS. 18A to 18C). After the locking displaceable element 54 being mechanically stopped at the unlocked position, the power supply to the motor 44 is stopped because of elapse of the set length of time of the application and the locking displaceable element 54 is held at the stopped position. Where the manual operation element 38 is located at the intermediate position 38M illustrated in FIG. 18A at the start of the unlocking operation, during the electrical unlocking operation, neither the locking active surface 106a and the locking passive surface 111a nor the unlocking active surface 108a and the unlocking passive surface 113a engages (come into abutment) with each other. In other words, in FIG. 18C, the locking active surface 106a and the locking passive surface 111a are close to each other but not in abutment with each other. Therefore, during the electrical unlocking operation, the manual operation element 38 remains still at the intermediate position 38M and does not rotate. In this way, in a locking operation and an unlocking operation by electrical operation, the manual operation element 38 does not perform a linked operation (operation of the manual operation element 38 following the locking operation or the unlocking operation) and thus the rotary shaft 50 of the manual operation element 38 is prevented from sliding on the seal packing 55 (FIG. 4). Therefore, a load on the electrical driving mechanism 60 can be reduced. Also, with reference to FIG. 18C, in a locking operation and an unlocking operation by electrical operation, the locking pin 36 can be displaced by an amount of distance that is a sum of a distance g1 between the locking active surface 106a and the unlocking active surface 108a and a distance g2 between the locking passive surface 111a and the unlocking passive surface 113a, without making the manual operation element 38 perform a linked operation. Therefore, even if a distance between the locking passive surface 111a and the unlocking passive surface 113a (both are disposed at the slider 48) is set to be short in comparison with a displacement distance of the locking pin 36 necessary for displacement of the locking pin 36 between the locked position and the unlocked position, the manual operation element 38 can be prevented from performing a linked operation at the time of electrical operation. Consequently, a dimension in the front-rear direction (displacement direction) of the slider 48 can be made to be small, enabling a dimension in a front-rear direction of the actuator device 28 to be small. As a result, the actuator device 28 can be formed to be small. Note that in FIG. 18C, an alternate long and two short dashes line 36' indicates a position of the locking pin 36 after a locking operation by electrical operation. A displacement distance g3 of displacement of the locking pin 36 between the locked position and the unlocked position by electrical operation is set to be larger than each of the distances g1, g2 but be slightly smaller than a distance g1+g2.

<<Locking Operation by Manual Operation (FIGS. 19A to 19C)>>

Figure 19A:
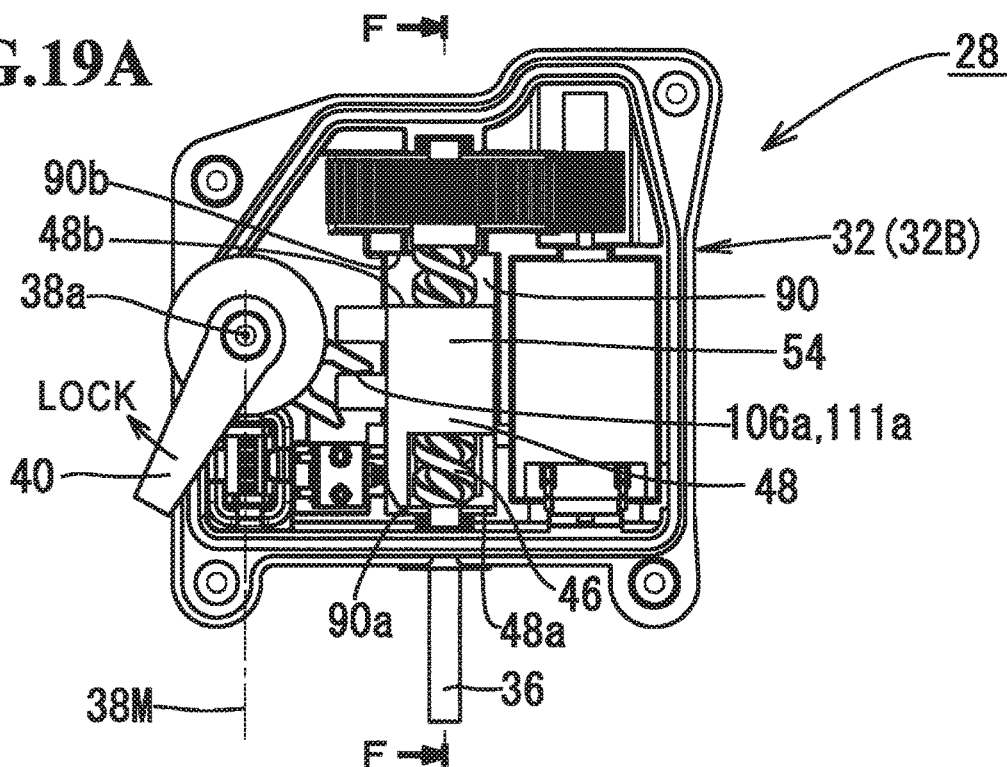
FIG. 19A is a plan view of the port locking actuator device in FIG. 2 with the upper housing removed and illustrates a state in which the locking displaceable element has been displaced to a locked position via manual operation.
Figure 19B:
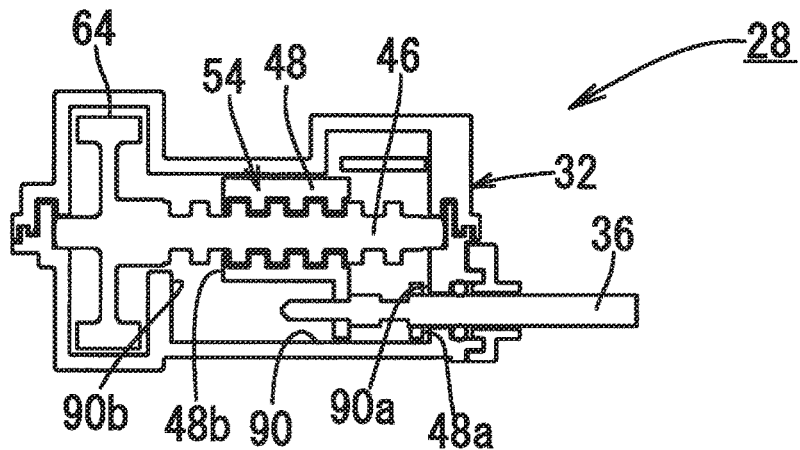
FIG. 19B is an arrow F-F sectional view of FIG. 19A.
Figure 19C:
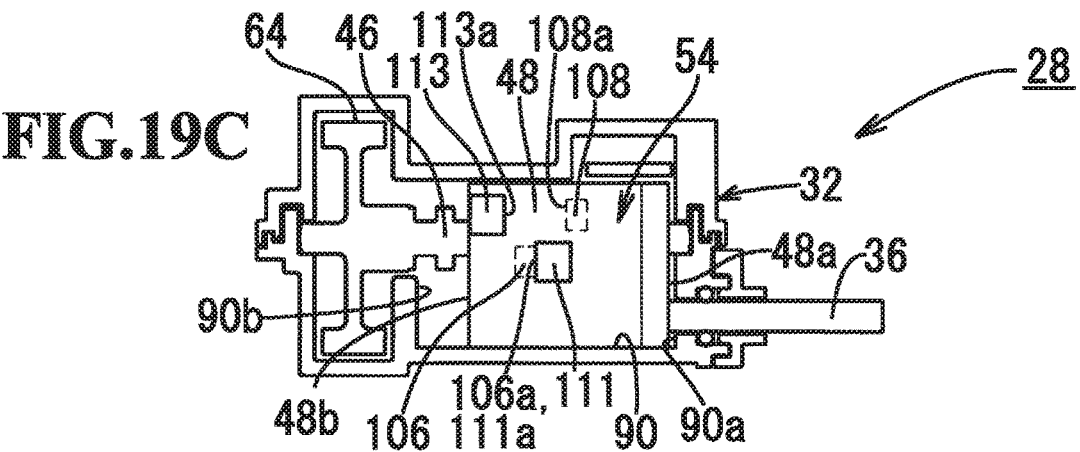
FIG. 19C is a diagram in which the locking active surface forming projection of the manual operation element, the unlocking active surface forming projection of the manual operation element, the locking passive surface forming projection of the slider and the unlocking passive surface forming projection of the slider are superimposed on FIG. 19B, and illustrates a positional relationship among the locking active surface of the manual operation element, the unlocking active surface of the manual operation element, the locking passive surface of the slider and the unlocking passive surface of the slider.

FIGS. 19A to 19C illustrate a state in which the locking displaceable element 54 has been displaced to the locked position via manual operation. The locking operation by manual operation is performed by manually rotating the manual operation element 38 in the locking direction (clockwise). In other words, upon the manual operation element 38 being rotated in the locking direction, the locking active surface 106a engages with the locking passive surface 111a and presses and transfers the locking displaceable element 54 toward the locked position. Along with the transfer, the locking pin 36 projects from the housing 32. Upon the locking displaceable element 54 reaching the locked position, the manual operation element stopper abutment surface 105a (FIG. 8B) of the manual operation element 38 abuts against the manual operation element stopper 102a (FIG. 7B) of the upper housing 32A (state in FIG. 15A) before the locking displaceable element stopper abutment surface 48a (front end surface of the slider 48) abutting the locking displaceable element stopper 90a (front end surface of the slider receiving space 90). Consequently, further displacement of the manual operation element 38 is prevented. At this time, as illustrated in FIG. 19C, the locking displaceable element stopper abutment surface 48a and the locking displaceable element stopper 90a are close to each other but are not in abutment with each other. Therefore, an excessive force is prevented from being applied between the locking active surface 106a and the locking passive surface 111a, resulting in breakage of, e.g., the locking active surface forming projection 106 or the locking passive surface forming projection 111 being prevented. Note that upon locking displaceable element 54 being displaced to the unlocked position via electrical operation from the state in FIG. 19, the manual operation element 38 is pressed back to the intermediate position 38M by the locking passive surface 111a abutting against and pressing the locking active surface 106a. In other words, the manual operation element 38 automatically returns to the intermediate position 38M and stops.

<<Unlocking Operation by Manual Operation (FIGS. 20A to 20C)>>

Figure 20A:
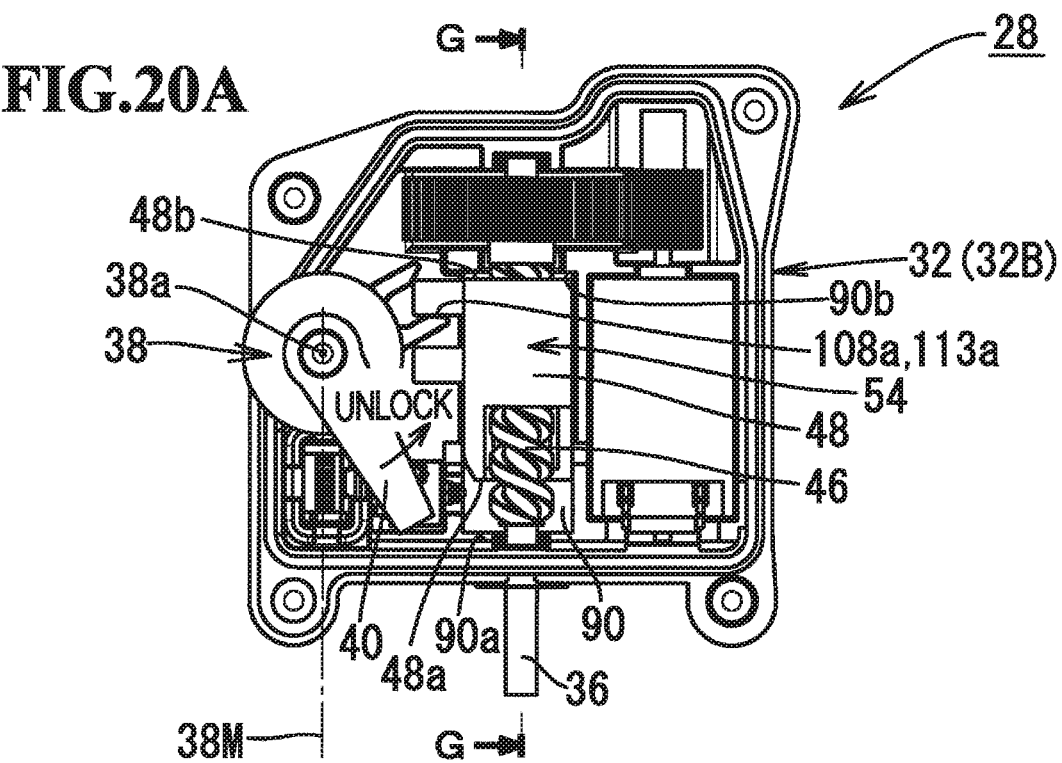
FIG. 20A is a plan view of the port locking actuator device illustrated in FIG. 2 with the upper housing removed and illustrates a state in which the locking displaceable element has been displaced to the unlocked position via manual operation.
Figure 20B:
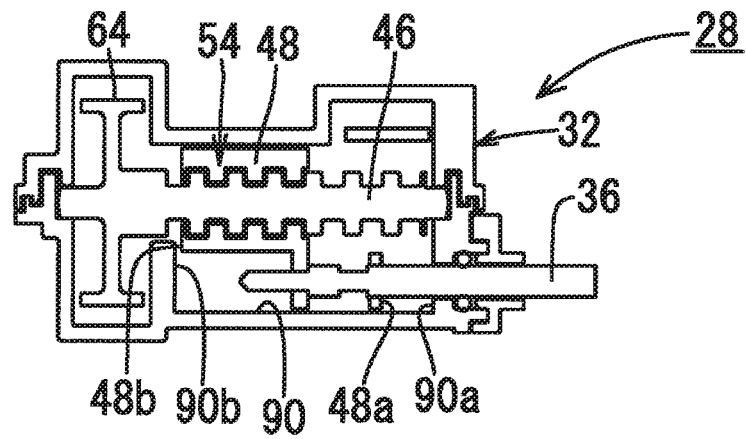
FIG. 20B is an arrow G-G sectional view of FIG. 20A.
Figure 20C:
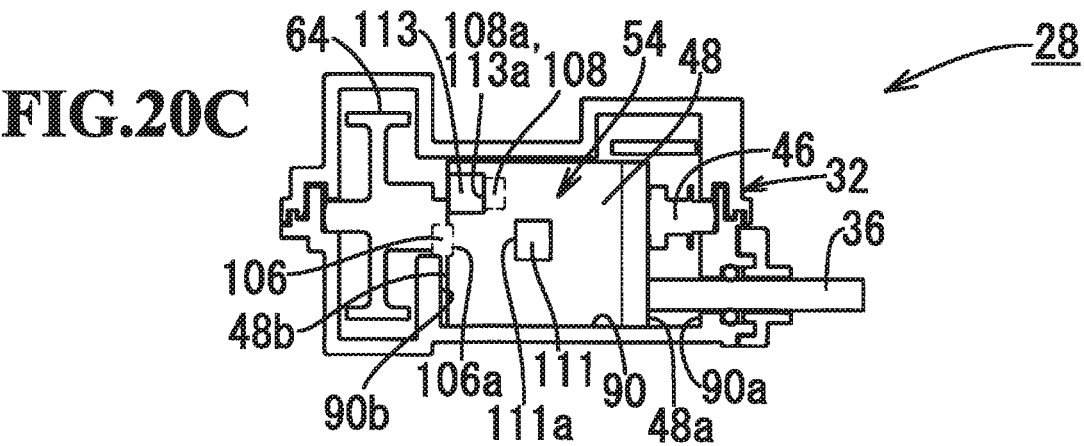
FIG. 20C is a diagram in which the locking active surface forming projection of the manual operation element, the unlocking active surface forming projection of the manual operation element, the locking passive surface forming projection of the slider and the unlocking passive surface forming projection of the slider are superimposed on FIG. 20B and illustrates a positional relationship among the locking active surface of the manual operation element, the unlocking active surface of the manual operation element, the locking passive surface of the slider and the unlocking passive surface of the slider.

FIGS. 20A and 20C illustrate a state in which the locking displaceable element 54 has been displaced to the unlocked position via manual operation. The unlocking operation by manual operation is performed by manually rotating the manual operation element 38 in the unlocking direction (counterclockwise). In other words, upon the manual operation element 38 being rotated in the unlocking direction, the unlocking active surface 108a engages with the unlocking passive surface 113a and presses and transfers the locking displaceable element 54 toward the unlocked position. Along with the transfer, the locking pin 36 is retracted into the housing 32. Upon the locking displaceable element 54 reaching the unlocked position, the manual operation element stopper abutment surface 105b (FIG. 8B) of the manual operation element 38 abuts against the manual operation element stopper 102b (FIG. 7B) of the upper housing 32A (state in FIG. 15B) before the locking displaceable element stopper abutment surface 48b (rear end surface of the slider 48) abutting against the locking displaceable element stopper 90b (rear end surface of the slider receiving space 90). Consequently, further displacement of the manual operation element 38 is prevented. At this time, as illustrated in FIG. 20C, the locking displaceable element stopper abutment surface 48b and the locking displaceable element stopper 90b are close to each other but are not in abutment with each other. Therefore, an excessive force is prevented from being applied between the unlocking active surface 108a and the unlocking passive surface 113a, resulting in breakage of, e.g., the unlocking active surface forming projection 108 or the unlocking passive surface forming projection 113 being prevented. Note that upon the locking displaceable element 54 being displaced to the locked position via the electrical operation from the state in FIG. 20, the manual operation element 38 is pressed back to the intermediate position 38M by the unlocking passive surface 113a abutting against and pressing the unlocking active surface 108a. In other words, the manual operation element 38 automatically returns to the intermediate position 38M and stops.

In the above embodiment, the round gear and the feed screw are formed as a single-piece member; however, the present invention is not limited to this example, and the round gear and the feed screw can be formed as separate components and assembled together for use. Also, the round gear and the feed screw are not limited to those of resin and can be formed of metal. In the above embodiment, the number of preceding gears disposed between the round gear and the motor is one; however, the present invention is not limited to this example, and the preceding gear can be formed of a plurality of gears. In the above embodiment, a sectional shape of the locking pin in a direction perpendicular to the axis of the locking pin is a round shape; however, the present invention is not limited to this example, and the sectional shape can be a quadrilateral or other shape. In such case, the center axis of the locking pin refers to an axis extending through the center of gravity of the sectional shape. In the above embodiment, the combination of the round gear and the preceding gear immediately preceding the round gear is formed of a combination of spur gears; however, the present invention is not limited to this example. For example, the combination of the round gear and the preceding gear immediately preceding the round gear can be formed of a worm gear using the round gear as a worm wheel and the preceding gear as a worm. In the above embodiment, a sectional shape in a direction perpendicular to the axis of the vehicle inlet is a round shape; however, the present invention is not limited to this example, and the sectional shape may be a shape other than a round shape. In such case, the center axis of the vehicle inlet refers to an axis extending through the center of gravity of the sectional shape. In the above embodiment, the locking displaceable element is formed by coupling a slider and a locking pin formed of different members; however, the configuration of the locking displaceable element is not limited to this example. In other words, a locking displaceable element can be configured by forming a slider and a locking pin as a single-piece member using a same material. The above embodiment has been described in terms of a case where the present invention is applied to an alternate-current normal charging system complying with the IEC standard "IEC 62196 TYPE 1" and the SAE standard "SAE J1772"; however, the present invention is not limited to this example, and the present invention is applicable also to an alternate-current normal charging system complying with the China national standard "GB/T 20234.2" and other normal charging systems each including a latch device. Also, the present invention is applicable not only to a normal charging system but also to a quick charging system, and furthermore, a combo-connector system in which a connector for normal charging and a connector for quick charging are combined as long as such systems include a latch device.

The invention claimed is:

1. A port locking actuator device for locking a state in which a charging connector is connected to a vehicle inlet that allows the charging connector to be removably connected thereto, the port locking actuator device being installed at the vehicle inlet, wherein:
the charging connector and the vehicle inlet include a latch device that inhibits or allows pull-out of the charging connector connected to the vehicle inlet;
the latch device includes a latch and a latch release operation section included in the charging connector and a latch engagement portion included in an outer peripheral surface of the vehicle inlet;
the latch device inhibits pull-out of the charging connector by the latch being engaged with the latch engagement portion from an outer peripheral side of the vehicle inlet with the charging connector connected to the vehicle inlet, and allows pull-out of the charging connector by the latch release operation section being operated to retract the latch outwardly from that state and the engagement being thereby cancelled;
the port locking actuator device includes a locking pin and a locking pin driving mechanism;
the locking pin driving mechanism electrically makes the locking pin project in an insertion/removal direction of the charging connector to dispose the locking pin at a predetermined locked position adjacent to a back surface of the latch and thereby inhibits the latch from being retracted outwardly, and electrically retracts the locking pin in the insertion/removal direction of the charging connector from that state to dispose the locking pin at a predetermined unlocked position retracted from the back surface of the latch and thereby allows the latch to be retracted outwardly;
the locking pin driving mechanism include a motor, a preceding gear to be driven by the motor, a round gear that meshes with the preceding gear, a feed screw coaxially fixed to the round gear, and a slider threadably connected to the feed screw;
the locking pin is mounted in the slider;
a center axis of the locking pin and a center axis of the feed screw are each disposed in parallel with a center axis of the vehicle inlet that is parallel to the insertion/removal direction of the charging connector; and
a positional relationship between the feed screw and the locking pin relative to the vehicle inlet is set in such a manner that an interaxial distance between the center axis of the vehicle inlet and the center axis of the feed screw is larger than an interaxial distance between the center axis of the vehicle inlet and the center axis of the locking pin.

2. The port locking actuator device according to claim 1, wherein in a plane orthogonal to the respective center axes of the vehicle inlet, the locking pin and the feed screw, respective positions of the three center axes are aligned on a straight line.

3. The port locking actuator device according to claim 1, wherein the locking pin is mounted in the slider so as to orient toward a direction opposite to a direction from the slider toward the round gear.

4. The port locking actuator device according to claim 3, wherein the locking pin is disposed at a position at which the center axis of the locking pin falls within a plane of the round gear.

5. The port locking actuator device according to claim 1, wherein the preceding gear is a gear directly coupled to the motor.

6. The port locking actuator device according to claim 5, wherein each of the preceding gear and the round gear is a spur gear.

* * * * *